United States Patent
Bonwick et al.

(10) Patent No.: US 8,554,997 B1
(45) Date of Patent: *Oct. 8, 2013

(54) METHOD AND SYSTEM FOR MIRRORED MULTI-DIMENSIONAL RAID

(71) Applicants: Jeffrey S. Bonwick, Los Altos, CA (US); Michael W. Shapiro, San Francisco, CA (US)

(72) Inventors: Jeffrey S. Bonwick, Los Altos, CA (US); Michael W. Shapiro, San Francisco, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,246

(22) Filed: Jan. 18, 2013

(51) Int. Cl.
G06F 12/00 (2006.01)

(52) U.S. Cl.
USPC ............ 711/114; 711/111; 711/156; 714/6.2; 714/6.22; 714/6.23

(58) Field of Classification Search
USPC .......... 711/103, 111, 114, 156; 714/6.2, 6.22, 714/6.23
See application file for complete search history.

(56) References Cited

U.S. PATENT DOCUMENTS

| | | | |
|---|---|---|---|
| 6,351,838 B1 | 2/2002 | Amelia | |
| 7,398,418 B2 | 7/2008 | Soran et al. | |
| 7,406,621 B2 | 7/2008 | Lubbers et al. | |
| 7,543,100 B2 | 6/2009 | Singhal et al. | |
| 7,752,389 B1 | 7/2010 | Fan | |
| 7,934,120 B2 | 4/2011 | Zohar et al. | |
| 8,078,906 B2 | 12/2011 | Yochai et al. | |
| 8,145,840 B2 | 3/2012 | Koul et al. | |
| 8,200,887 B2 | 6/2012 | Bennett | |
| 8,327,185 B1 | 12/2012 | Bonwick | |
| 2002/0161972 A1 | 10/2002 | Talagala et al. | |
| 2004/0153961 A1 | 8/2004 | Park et al. | |
| 2005/0166083 A1 | 7/2005 | Frey et al. | |
| 2005/0223156 A1 | 10/2005 | Lubbers et al. | |
| 2006/0085594 A1 | 4/2006 | Roberson et al. | |
| 2008/0109602 A1 | 5/2008 | Ananthamurthy et al. | |
| 2008/0168225 A1 | 7/2008 | O'Connor | |
| 2009/0187786 A1 | 7/2009 | Jones et al. | |
| 2010/0199125 A1 | 8/2010 | Reche | |
| 2012/0079318 A1 | 3/2012 | Colgrove et al. | |
| 2012/0089778 A1 | 4/2012 | Au et al. | |
| 2012/0166712 A1 | 6/2012 | Lary | |

FOREIGN PATENT DOCUMENTS

EP  1577774 A2  9/2005

OTHER PUBLICATIONS

Anvin, H., "The mathematics of RAID-6", retrieved from the Internet at http://www.cs.utk.edu/plank/plank/papers/CS-96-332.html, Jan. 20, 2004 (9 pages).

Kazmi, A., "PCI Express™ Basics & Applications in Communication Systems," PCI-SIG Developers Conference, 2004 (50 pages).

(Continued)

Primary Examiner — Jasmine Song
(74) Attorney, Agent, or Firm — Osha Liang LLP

(57) ABSTRACT

A method for storing data. The method includes receiving a request to write data, determining that the storage mode for the data is mirrored mode, selecting a Redundant Array of Independent Devices (RAID) grid location in a RAID grid to write the data based on the storage mode, writing the data to memory, updating a data structure to indicate that the RAID grid location is filled, and determining a data grid is filled. Based on the determination, determining a first physical address and a second physical address in persistent storage corresponding to the RAID grid location; writing the data to a first physical location in the persistent storage corresponding to the first physical address and writing the data to a second physical location in the persistent storage corresponding to the second physical address, and writing the parity values associated with data grid to the persistent storage.

19 Claims, 22 Drawing Sheets

(56) References Cited

OTHER PUBLICATIONS

Percival, D., "Multicast Over PCT Express®," PCI-SIG Developer's Conference Europe, 2009 (33 pages).
Huffman, A., NVM Express Revision 1.0b, Jul. 12, 2011 (126 pages).
Regula, J., Using Non-transparent Bridging in PCI Express Systems, Jun. 1, 2004 (1 pages).
International Search Report issued in PCT/US2013/033224 mailed Jul. 31, 2013 (5 pages).
Written Opinion issued in PCT/US2013/033224 mailed Jul. 31, 2013 (10 pages).

|         |         |         |
|---------|---------|---------|
| <1,3,4> | <2,3,4> | <3,3,4> |
| <1,2,4> | <2,2,4> | <3,2,4> |
| <1,1,4> | <2,1,4> | <3,1,4> |

P Parity RAID Grid 310

IFD 2 (vertical axis), IFD 1 (horizontal axis)

Value for <1,1,4> Grid location =
$f$(value at <1,1,1>, value at <1,1,2>, value at <1,1,3>)

|         |         |         |
|---------|---------|---------|
| <1,3,5> | <2,3,5> | <3,3,5> |
| <1,2,5> | <2,2,5> | <3,2,5> |
| <1,1,5> | <2,1,5> | <3,1,5> |

Q Parity RAID Grid 312

IFD 2 (vertical axis), IFD 1 (horizontal axis)

Value for <1,1,5> Grid location =
$f$(value at <1,1,1>, value at <1,1,2>, value at <1,1,3>)

METHOD AND SYSTEM FOR MIRRORED MULTI-DIMENSIONAL RAID

BACKGROUND

In order to protect against potential loss of data in a storage system, it is often advantageous to implement a replication scheme. Current replication schemes are only able to sustain a limited amount of error before data within the storage system is unable to be read.

SUMMARY

In general, in one aspect, the invention relates to, a non-transitory computer readable medium comprising instructions, which when executed by a processor perform a method, the method for storing data comprising receiving a request to write data, determining a storage mode for the data, wherein the storage mode for the data is mirrored mode, selecting, a Redundant Array of Independent Devices (RAID) grid location in a RAID grid to write the data based on the storage mode, writing the data to memory, wherein the data is temporarily stored in the memory, updating a data structure to indicate that the RAID grid location is filled, determining, using the data structure, whether a data grid in the RAID grid is filled, wherein the RAID grid location is in the data grid, based on a determination that the data grid is filled: calculating parity values for the RAID grid using the data, determining a first physical address in persistent storage corresponding to the RAID grid location, determining a second physical address in the persistent storage corresponding to the RAID grid location, writing the data to a first physical location in the persistent storage corresponding to the first physical address, writing the data to a second physical location in the persistent storage corresponding to the second physical address, and writing the parity values associated with data grid to the persistent storage.

In general, in one aspect, the invention relates to a non-transitory computer readable medium comprising instructions, which when executed by a processor perform a method, the method for obtaining reconstructing data, comprising: receiving a first request for data, identifying a grid location in a Redundant Array of Independent Devices (RAID) grid associated with the data, wherein the grid location is associated with a first physical location and a second physical location, making a first determination that a storage mode for the grid location is mirrored mode, based on the first determination, making a second determination that the first physical location is busy, based on the second determination, issuing a second request for the data to the second physical location, and in response to the second request, receiving the data from the second physical location, wherein the grid location is associated with a virtual stripe, wherein the virtual stripe is associated with a first physical stripe and a second physical stripe, wherein the first physical location is part of the first physical stripe and the second physical location is part of the second physical stripe.

Other aspects of the invention will be apparent from the following description and the appended claims.

BRIEF DESCRIPTION OF DRAWINGS

FIGS. 3B-3C show RAID grids in accordance with one embodiment of the invention.

DETAILED DESCRIPTION

Figure 1:
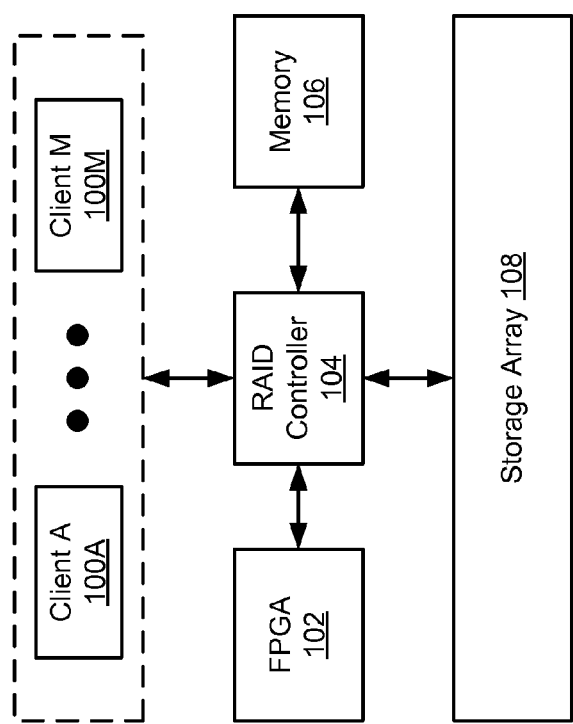
FIG. 1 shows a system in accordance with one embodiment of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8E, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for replicating data using a multi-dimensional RAID scheme that implements mirroring at the grid location level. More specifically, embodiments of the invention provide a method and system for implementing a 2D RAID scheme and a 3D RAID scheme each of which implements mirroring at the grid location level.

Using a 2D RAID scheme, the data stored within a RAID grid implementing such a RAID scheme may be recovered when there are more than two errors in a given RAID stripe. Similarly, using a 3D RAID scheme, the data stored within a RAID cube implementing such a RAID scheme may be recovered when there are more than two errors in a given RAID stripe. In various embodiments of the invention, all data is able to be recovered when there is a failure in more than one independent fault domain (IFD). Further, by enabling mirroring at the grid location level, embodiments of the invention provide an additional level of replication/redundancy while mitigating potential latency issues related to accessing data from persistent storage.

In one or more embodiments of the invention, an IFD corresponds to a failure mode which results in the data at a given location being inaccessible. Each IFD corresponds to an independent mode of failure in the storage array. For example, if the data is stored in NAND flash, where the NAND flash is part of a storage module (which includes multiple NAND dies), then the IFDs may be (i) storage module, (ii) channel (i.e., the channel used by the storage module controller (not shown) in the storage module to write data to the NAND flash), and (iii) NAND flash dies.

For purposes of this invention, the term "RAID" as used herein refers to "Redundant Array of Independent Devices." Accordingly, embodiments of the invention may be implemented using any type of persistent storage device where the RAID grid locations (see e.g., FIG. 2A) may be distributed across one or more persistent storage devices based on the implementation of the invention (see e.g., FIGS. 2B-4B).

FIG. 1 shows a system in accordance with one embodiment of the invention. As shown in FIG. 1, the system includes one or more clients (100A, 100M), a RAID controller (104), memory (106), optionally an FPGA (102), and a storage array (108).

In one embodiment of the invention, a client (100A, 100M) is any system or process executing on a system that includes functionality to issue a read request or a write request to the RAID controller (104). In one embodiment of the invention, the clients (100A, 100M) may each include a processor (not shown), memory (not shown), and persistent storage (not shown). In one embodiment of the invention, the RAID controller (104) is configured to implement the multi-dimensional RAID scheme, which includes writing data to the storage array in a manner consistent with the multi-dimensional RAID scheme (see FIGS. 5A-5C) and reading data (including reconstructing data) from the storage array in a manner consistent with the multi-dimensional RAID scheme (see FIGS. 7A-7B). In one embodiment of the invention, the RAID controller (104) includes a processor configured to execute instructions to implement one or more embodiments of the invention, where the instructions are stored on a non-transitory computer readable medium (not shown) that is located within or that is operatively connected to the RAID controller (104). Alternatively, the RAID controller (104) may be implemented using hardware. Those skilled in the art will appreciate that the RAID controller (104) may be implemented using any combination of software and/or hardware.

In one embodiment of the invention, the RAID controller (104) is operatively connected to memory (106). The memory (106) may be any volatile memory including, but not limited to, Dynamic Random-Access Memory (DRAM), Synchronous DRAM, SDR SDRAM, and DDR SDRAM. In one embodiment of the invention, the memory (106) is configured to temporarily store various data (including parity data) prior to such data being stored in the storage array.

In one embodiment of the invention, the FPGA (102) (if present) includes functionality to calculate P and/or Q parity information for purposes of storing data in the storage array (108) and/or functionality to perform various calculations necessary to recover corrupted data stored using the multi-dimensional RAID scheme(s). The RAID controller (104) may use the FPGA (102) to offload the processing of various data in accordance with one or more embodiments of the invention. In one embodiment of the invention, the storage array (108) includes a number of individual persistent storage devices including, but not limited to, magnetic memory devices, optical memory devices, solid state memory devices, phase change memory devices, any other suitable type of persistent memory device, or any combination thereof. Each of aforementioned devices may be generically referred to throughout this description as a storage module unless otherwise specified.

Those skilled in the art will appreciate that while FIG. 1 shows an FPGA, the invention may be implemented without an FPGA. Further, those skilled in the art will appreciate that other components may be used in place of the FPGA without departing from the invention. For example, the invention may be implemented using an ASIC(s), a graphics processing unit(s) (GPU), a general purpose processor(s), any other hardware device capable of calculating P and/or Q parity information for purposes of storing data in the storage array and/or performing various calculations necessary to recover corrupted data stored using the multi-dimensional RAID scheme, any devices that includes a combination of hardware, firmware, and/or software configured to calculate P and/or Q parity information for purposes of storing data in the storage array (108) and/or to perform various calculations necessary to recover corrupted data stored using the multi-dimensional RAID scheme, or any combination thereof.

Figure 2A:
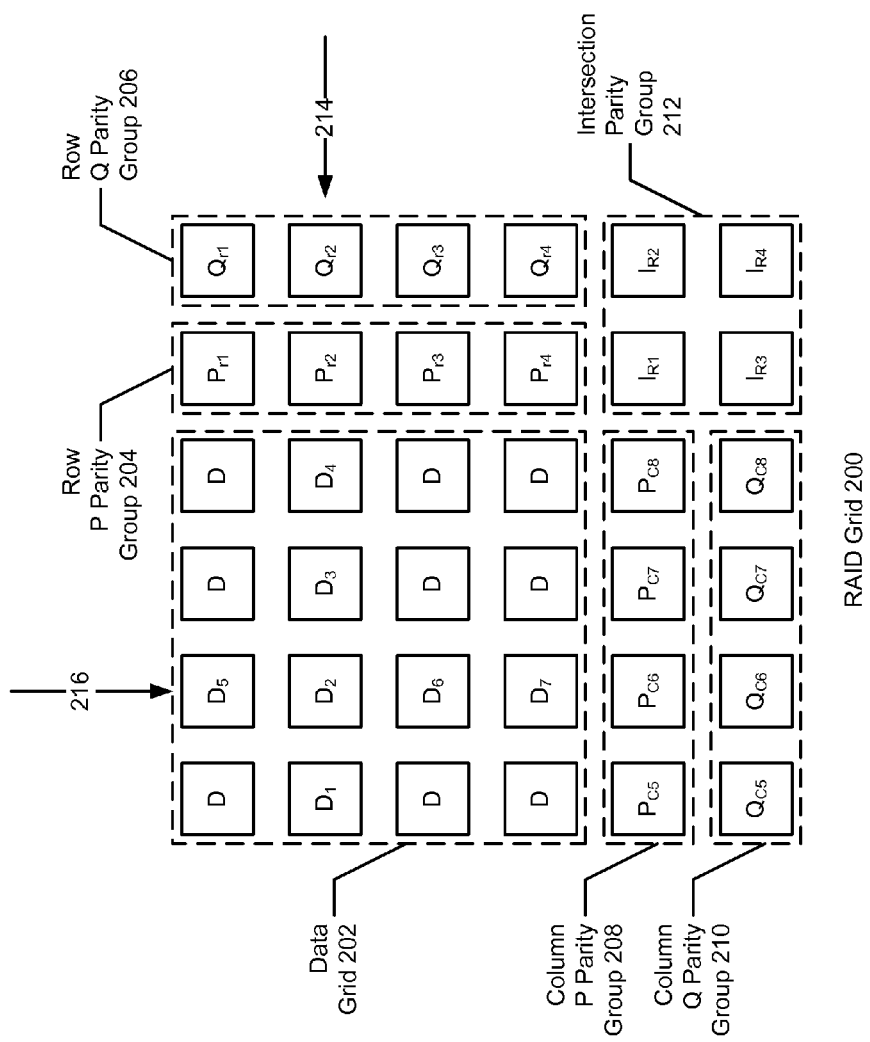
FIG. 2A shows a RAID grid in accordance with one embodiment of the invention.

FIG. 2A shows a RAID grid in accordance with one embodiment of the invention. In one embodiment of the invention, if the RAID controller implements a 2D RAID scheme or a 3D RAID scheme (see FIG. 3A), the RAID controller stores data in a RAID Grid (200). FIG. 2A shows the conceptual portions of a RAID grid in accordance with one or more embodiments of the invention. The RAID grid (200) includes a number of RAID grid locations, where data associated with each RAID grid location is ultimately written to two (or more) unique physical locations in the storage array (see FIG. 2B). The RAID grid (200) includes (i) a data grid (202), which includes RAID grid locations that store data received from the client (i.e., data that the client has instructed the RAID controller to write to the storage array); (ii) a row P parity group (204), which includes the RAID grid locations that store the P parity values calculated using data in RAID grid locations in a virtual stripe along a row dimension (see FIG. 2A, 214 and FIG. 6A, 602); (iii) a row Q parity group (206), which includes the RAID grid locations that store the Q parity values calculated using data in RAID grid locations in a virtual stripe along a row dimension (see FIG. 2A, 214 and FIG. 6A, 602); (iv) a column P parity group (208), which includes the RAID grid locations that store the P parity values calculated using data in RAID grid locations in a virtual stripe along a column dimension (see FIG. 2A, 216 and FIG. 6A, 604); (v) a column Q parity group (210), which includes the RAID grid locations that store the Q parity values calculated using data in RAID grid locations in a virtual stripe along a column dimension (see FIG. 2A, 216 and FIG. 6A, 604); and (vi) an intersection parity group (212), which includes parity values calculated using (a) data from RAID grid locations in row P parity group (204), (b) data from RAID grid locations in row Q parity group (206), (c) data from RAID grid locations in column P parity group (208), and (d) data from RAID grid locations in column Q parity group (210) (described below).

Referring to row (214), in one embodiment of the invention, the data stored in RAID grid location denoted as $P_{r2}$ in row (214) is calculated by applying a P parity function to all RAID grid locations in the row (214) that includes data (e.g., $P_{r2}=f_P(D_1, D_2, D_3, D_4)$. Similarly, in one embodiment of the invention, the data stored in RAID grid location denoted as $Q_{r2}$ in row (214) is calculated by applying a Q parity function to all RAID grid locations in the row (214) that includes data (e.g., $Q_{r2}=f_Q(D_1, D_2, D_3, D_4)$).

Referring to column (216), in one embodiment of the invention, data stored in the RAID grid location denoted as $P_{c6}$ in column (216) is calculated by applying a P parity function to all RAID grid locations in the column (216) that includes data (e.g., $P_{C6}=f_P(D_5, D_2, D_6, D_7)$). Similarly, in one embodiment of the invention, data stored in the RAID grid location denotes by $Q_{C6}$ in column (216) is calculated by applying a Q parity function to all RAID grid locations in the column (216) that includes data (e.g., $Q_{C6}=f_Q(D_5, D_2, D_6, D_7)$).

Referring to the intersection parity group (212), in one embodiment of the invention, the data stored in the RAID grid location denoted as $I_{r1}$ may be calculated by applying a P parity function to all RAID grid locations in the row P Parity Group (204) or by applying a P parity function to all RAID grid locations in the column P Parity Group (208). For example, $I_{r1}=f_P(P_{r1}, P_{r2}, P_{r3}, P_{r4})$ or $I_{r1}=f_P(P_{c5}, P_{c6}, P_{c7}, P_{c8})$.

In one embodiment of the invention, the data stored in the RAID grid location denoted as $I_{r2}$ may be calculated by applying a P parity function to all RAID grid locations in the row Q Parity Group (206) or by applying a Q parity function to all RAID grid locations in the column P Parity Group (208). For example, $I_{r2}=f_P(Q_{r1}, Q_{r2}, Q_{r3}, Q_{r4})$ or $I_{r2}=f_Q(P_{c5}, P_{c6}, P_{c7}, P_{c8})$.

In one embodiment of the invention, the data stored in the RAID grid location denoted as $I_{r3}$ may be calculated by applying a P parity function to all RAID grid locations in the column Q Parity Group (210) or by applying a Q parity function to all RAID grid locations in the row P Parity Group (204). For example, $I_{r3}=f_P(Q_{c5}, Q_{c6}, Q_{c7}, Q_{c8})$ or $I_{r3}=f_Q(P_{c1}, P_{c2}, P_{c3}, P_{c4})$.

In one embodiment of the invention, the data stored in the RAID grid location denoted as $I_{r4}$ may be calculated by applying a Q parity function to all RAID grid locations in the column Q Parity Group (210) or by applying a Q parity function to all RAID grid locations in the row Q Parity Group (206). For example, $I_{r4}=f_Q(Q_{c1}, Q_{c2}, Q_{c3}, Q_{c4})$ or $I_{r4}=f_Q(Q_{c5}, Q_{c6}, Q_{c7}, Q_{c8})$.

In one embodiment of the invention, the P and Q parity functions used to calculate the values for all of parity groups may correspond to any P and Q parity functions used to implement RAID 6.

As discussed above, the RAID grid (200) shown in FIG. 2A represents the conceptual layout of a RAID grid. However, the relative location of the various RAID grid locations may vary across a row and or a column. For example, referring to row (214), the relative location of RAID grid locations that include data (denoted by "D") and the RAID grid locations that include parity data (i.e., the RAID grid locations denoted as "$P_r$" and "$Q_r$") may be as follows: <$D_1, D_2, P_{r2}, D_3, Q_{r2}, D_4$>, <$P_{r2}, Q_{r2}, D_1, D_2, D_3, D_4$>, or any other arrangement within row (214). Similarly, referring to column (216), the relative location of RAID grid locations that include data (denoted by "D") and the RAID grid locations that include parity data (i.e., the RAID grid locations denoted as "$P_c$" and "$Q_c$") may be as follows: <$D_5, D_2, D_6, P_{c6}, D_6, Q_{c6}$>, <$P_{c6}, D_5, D_2, Q_{c6}, D_6, D_7$>, or any other arrangement within column (216).

The RAID controller (or another entity in the system) may determine to which physical addresses in the storage array each of the RAID grid locations is written. This determination may be made prior to receiving any of the data (denoted as "D") for a particular RAID grid from the client. Alternatively, the determination may be made prior to writing the data in the RAID grid locations to the storage array.

Those skilled in the art will appreciate that while FIG. 2A shows a RAID grid that is 6×6, the RAID grid may be implemented using any other dimensions without departing from the invention.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q=g^0 \cdot D_0 + g^1 \cdot D_1 + g^2 \cdot D_2 + \ldots + g^{n-1} \cdot D_{n-1}$, where Q corresponds any one of the Q parity values defined with respect to FIG. 2A, g is a generator of the field, and the value of D corresponds to the data (which may include both values from the data grid and/or values from one or more rows or columns that include P or Q parity values).

Those skilled in the art will appreciate that while the RAID grid in FIG. 2A includes P and Q parity for each row and column, embodiments of the invention may be implemented using greater or fewer parity values without departing from the invention. For example, each row and column may only include a P parity value. In another example, each row and column may include three parity values. The aforementioned examples are not intended to limit the invention. In one embodiment of the invention, regardless of the number of parity values used in the implementation of the invention, each of the parity values is a Reed-Solomon syndrome.

Figure 2B:
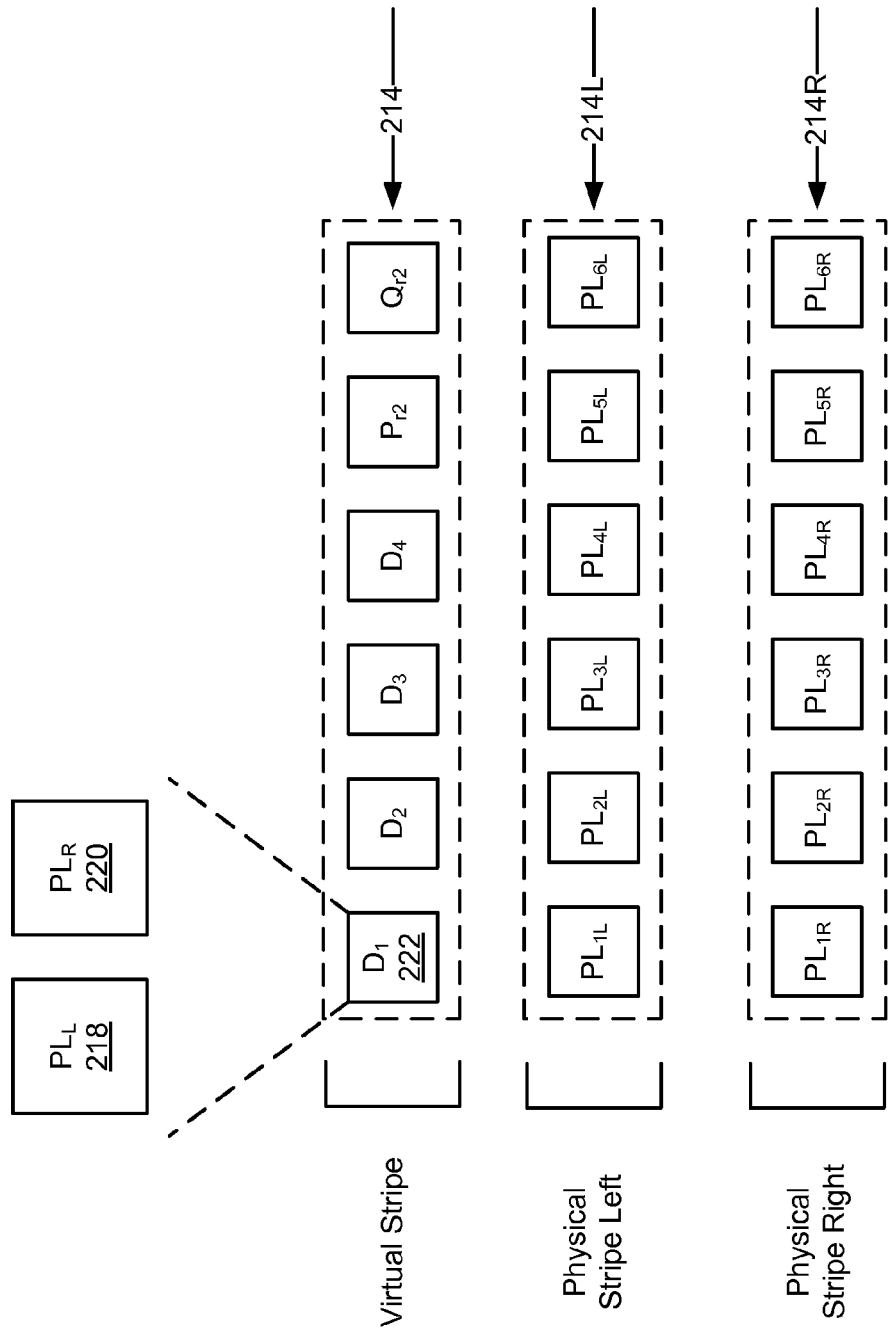
FIG. 2B shows virtual and physical stripes in accordance with one embodiment of the invention.

FIG. 2B shows virtual and physical stripes in accordance with one embodiment of the invention. In one embodiment of the invention, each RAID grid location (e.g., 222) is associated with two physical locations in persistent storage (218, 220). For purposes of this description, the two physical locations may be referred to as physical location left ($PL_L$) and physical location right ($PL_R$). The aforementioned labels are included solely for the purpose of describing the invention but are not intended to limit the invention.

Each of the aforementioned physical locations ($PL_L$ (218), $PL_R$ (220)) corresponds to a distinct physical location in the persistent storage. In one embodiment of the invention, the physical locations may be on the same storage module but on different NAND chips (on the same NAND die) in the storage module. Alternatively, each of the physical locations may be located on separate storage modules.

Returning to FIG. 2B, each row and column in the RAID grid shown in FIG. 2A may be referred to as a virtual stripe. For example, as shown in FIG. 2B, one virtual stripe is row (214), where row (214) is made up of RAID grid locations (denoted as $D_1, D_2, D_3, P_{r2}, Q_{r2}, D_4$). As discussed above, each of the RAID grid location is associated with two physical locations in persistent storage. From this it follows that each virtual stripe is associated with two physical stripes (214L, 214R) denoted as physical stripe left (PSL) and physical stripe right (PSR). The aforementioned labels are included solely for the purpose of describing the invention but are not intended to limit the invention. PSL (214L) includes all $PL_L$s associated with the RAID grid locations for row (214) and PSR (214R) includes all $PL_R$s associated with the RAID grid locations for row (214). As is discussed below, the parity values in each of PSL and PSR are calculated using the data values in the PSL and PSR. If the virtual stripe is operating in mirrored mode then the parity values in a PSL and a PSR for a given virtual stripe are identical. Alternatively, if the virtual stripe is operating in non-mirrored mode then the parity values in a PSL and a PSR for a given virtual stripe may be different.

Referring to FIG. 2B, the value of $PL_{5L}$ is determined by applying a P parity function to $PL_L$s that include data (as opposed to parity values) in the PSL (e.g., $PL_{5L}=f_P (PL_{1L}, PL_{2L}, PL_{3L}, PL_{4L})$. Similarly, the value of $PL_{6L}$ is determined by applying a Q parity function to $PL_L$s that include data (as opposed to parity values) in the PSL (e.g., $PL_{6L}=f_Q (PL_{1L}, PL_{2L}, PL_{3L}, PL_{4L})$. The location of data values and parity values in a given PSL and PSR correspond to the location of data values and parity values in the corresponding virtual stripe. For example, n FIG. 2B, the virtual stripe (214) P parity values are associated with RAID grid location $P_2R$. Accordingly, $PL_{5L}$ and $PL_{5R}$ include P parity values.

Figure 2C:
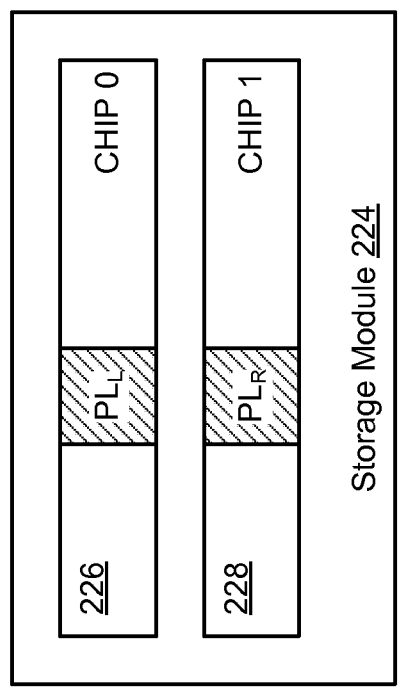
FIG. 2C shows a storage module in accordance with one embodiment of the invention.

FIG. 2C shows a storage module in accordance with one embodiment of the invention. As shown in FIG. 2C, values (data or parity) associated with a given RAID grid location may be written to the same storage module (224) but to different chips (226, 228) in the storage module. In one embodiment of the invention, the physical address corresponding to the physical location in the storage module may be represented using the following n-tuple: <storage module, channel, chip, plane, block, page, byte>. In such embodiments and with reference to FIG. 2C, the physical locations for $PL_L$ and $PL_R$ may be associated with the following physical addresses: $PL_L$:<storage module, channel, chip0, plane, block, page, byte> and $PL_R$:<storage module, channel, chip1, plane, block, page, byte>. Those skilled in the art will appreciate that the physical address in the storage module may be represented using other n-tuples without departing from the invention.

Figure 3A:
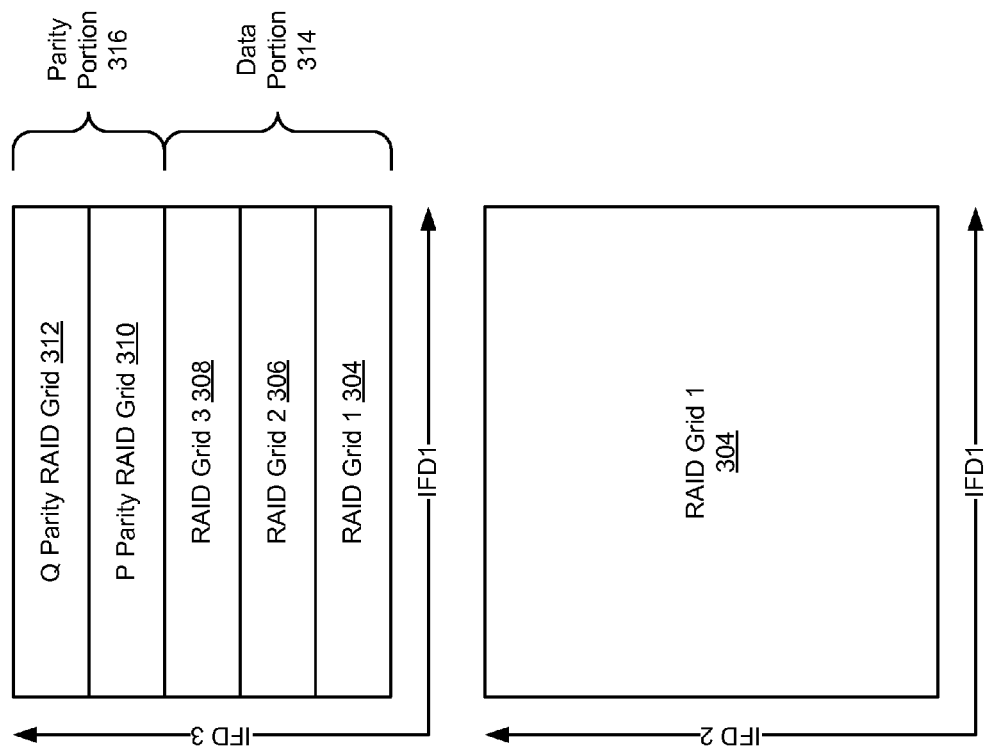
FIG. 3A shows a RAID cube and various view of the RAID cube in accordance with one embodiment of the invention.

FIG. 3A shows a RAID cube and various views of the RAID cube in accordance with one embodiment of the invention. As shown in FIG. 3A, a RAID cube (300) corresponds to a conceptual stack of RAID grids (for clarity only RAID grid (304) is shown within the RAID cube (300)). As discussed above, the RAID controller (or another entity in the system) selects the physical addresses within the storage array in which to store the data for each of the RAID grid locations. In one embodiment of the invention, the selection of the physical addresses may be determined in accordance with the IFDs for which the RAID grid (or RAID cube) is designed to protect against. Said another way, the physical addresses may be selected in a manner to protect against failures in one or more IFDs. For example, as shown in FIG. 3A, each RAID grid location (not shown) for a given RAID grid (304) is written to a physical address (or will be written to a physical address) in the storage array (not shown) that is selected using a unique pair of values from IFD 1 and IFD 2, but has the same value for IFD 3. For example, if the data in the storage array is stored in NAND flash, where the NAND flash is part of a storage module (which includes multiple NAND dies), then the IFDs may be as follows: (i) IFD 1=storage module, (ii) IFD 2=channel, and (iii) IFD 3=NAND die. Accordingly, in a given RAID grid, the data in each RAID grid location is written to a unique combination of storage module (IFD 1) and channel (IFD 2) but is written to the same NAND die (on each of the storage modules). Those skilled in the art will appreciate that the invention is not limited to the three independent fault domains described above. Further, those skilled in the art will appreciate that the invention is not limited to a storage array that includes NAND flash.

Continuing with FIG. 3A, as discussed above, the RAID cube (300) is a conceptual stack of RAID grids. More specifically, in one embodiment of the invention, the RAID cube (300) may include (i) a data portion (314), which includes two or more RAID grids (304, 306, 308) and a parity portion (316) that includes a P parity RAID grid (310) and a Q parity RAID grid (312).

In one embodiment of the invention, the RAID grids (304, 306, 308) in the data portion (314) include parity data (see FIG. 2A), which allows data within the RAID grid to be recovered using only data (including parity data) within the RAID grid. In one embodiment of the invention, the RAID cube is arranged such that data for a given RAID grid location in a given RAID grid (304, 306, 308) may be recovered using data (including parity data) from other RAID grids (in both the data portion (314) and the parity portion (316)). In one embodiment of the invention, the parity portion (316) of the RAID cube enables such a recovery mechanism.

Figure 3B:
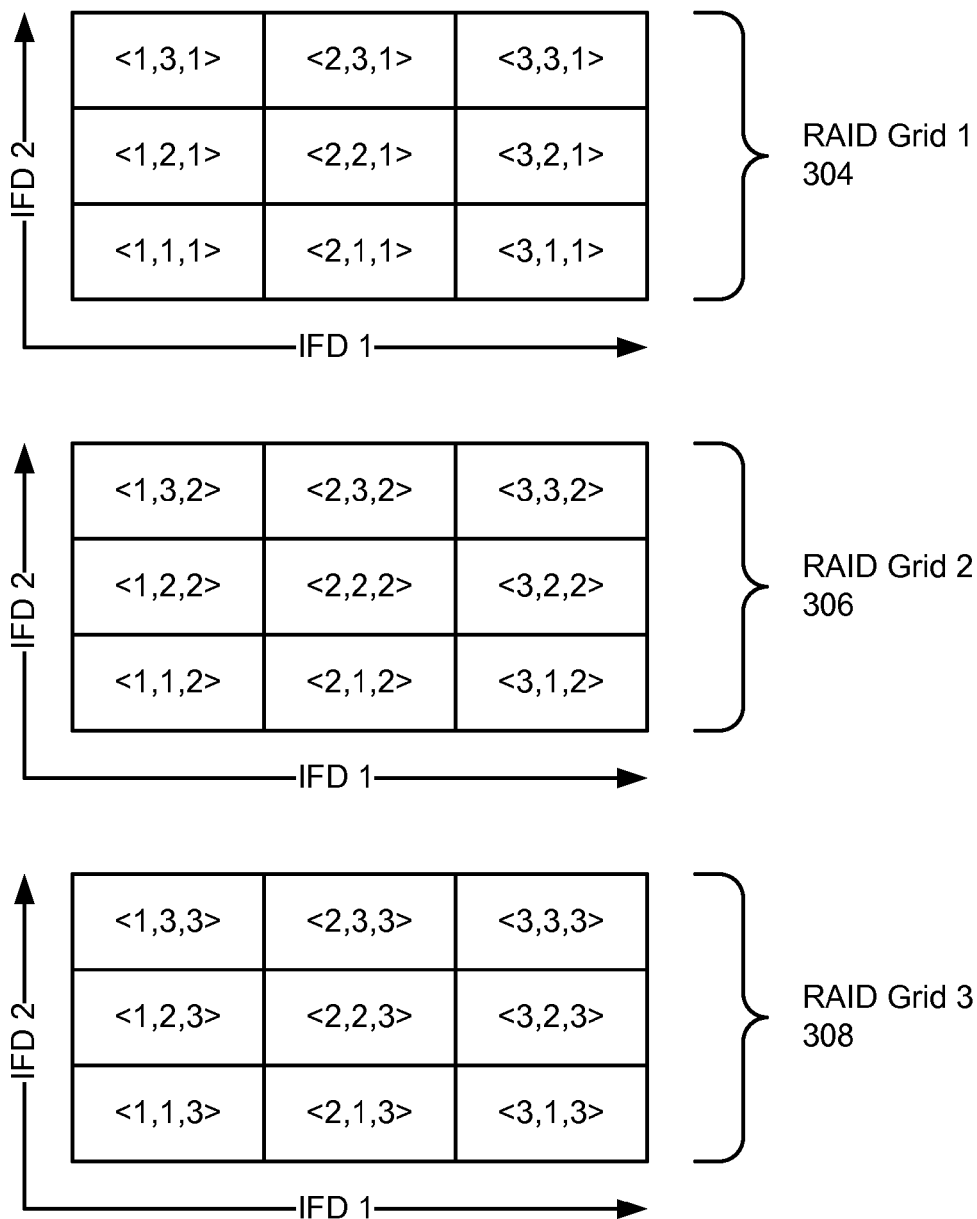

In one embodiment of the invention, the P parity RAID grid (310) is the same dimension as the underlying RAID grids (304, 306, 308), where the data in every RAID grid location within the P Parity RAID grid is calculated by applying a P parity function (e.g., an XOR function) to data (including parity data) from the RAID grids in the data portion 314 (see FIGS. 3B-3C). Similarly, the Q parity RAID grid 312 is the same dimension as the underlying RAID grids (304, 306, 308), where the data in every RAID grid location within the Q Parity RAID grid is calculated by applying a Q parity function to data (including parity data) from the RAID grids in the data portion (314) (see FIGS. 3B-3C).

FIGS. 3B-3C show an example of populating a RAID cube in accordance with one or more embodiments of the invention. The example is not intended to limit the scope of the invention.

Consider the RAID cube depicted in FIG. 3A, which includes RAID grid 1 (304) RAID grid 2 (306), RAID grid 3 (308), P parity RAID grid (310), and Q parity RAID grid (312). Further, each RAID grid (304, 306, 308) in the RAID cube includes RAID grid locations that are written across IFD 1 and IFD 2 but have a constant value of IFD 3. Accordingly, in one embodiment of the invention, the value of a RAID grid location (the "target RAID grid location") in a RAID grid may be recovered using (i) only values of RAID grid locations in the row or column in which the target RAID grid location is located; (ii) values of any RAID grid location within the RAID grid in which the target RAID grid location is located; or (iii) values of any RAID grid location within the RAID cube in which the target RAID grid location is located. Said another way, in one embodiment of the invention, the arrangement of the data and parity values within the RAID grid and/or RAID cube allows the value in a target RAID grid location to be recovered when there are more than two errors in each of the rows and columns in which the target RAID grid location is located.

Referring to FIG. 3B, FIG. 3B includes three RAID grids (304, 306, 308), which make up the data portion (314) of the RAID cube (300). Each of the RAID grid locations in each of the RAID grids (304, 306, 308) includes a 3-tuple defining the physical location in the storage array in which the data in the RAID grid location is written. In this example, the elements in the 3-tuple correspond to IFDs as follow: <IFD1, IFD2, IFD3>. The 3-tuples illustrate how the physical locations in the storage array are selected across the various IFDs. In particular, each of the RAID grid locations in RAID grid 1 includes a unique combination of IFD1 and IFD2, but the same value for IFD3. For example, if IFD1 is a storage module, IFD2 is a channel, and IFD3 is a NAND die, then 3-tuple <4,2,1> indicates that the data in the particular RAID grid location will be written to a physical address(es) corresponding to a physical location(s) in NAND die 1 in Storage module 4 using Channel 2. Similarly, the 3-tuple <2,3,1> indicates that the data in the particular RAID grid location will be written to a physical address(es) corresponding to a physical location(s) in NAND 1 in Storage module 2 using Channel 3.

RAID grid 2 (306) and RAID grid 3 (308) are arranged in a similar manner to RAID grid 1 (304). However, the value for IFD3 in the 3-tuples for RAID grid locations in RAID grid 2 (306) is different than the value of IFD3 in the 3-tuples for RAID grid locations for RAID grid 1 (304). Further, the value for IFD3 in the 3-tuples for RAID grid locations for RAID grid 3 (308) is different than the value of IFD3 in the 3-tuples for RAID grid locations for RAID grid 1 (304) and for RAID grid 2 (306).

Referring to FIG. 3C, data in each of the RAID grid locations in P Parity RAID grid (310) are arranged in a similar manner to RAID grid 1 (304), RAID grid 2 (306), and RAID grid 3 (308). Further, as described above, the value of the data in each of the RAID grid locations in P Parity RAID grid (310) is calculated using data from one RAID grid location in each of the data grids in the RAID cube (i.e., RAID grid 1 (304), RAID grid 2 (306), and RAID grid 3 (308)). For example, the value of the data at RAID grid location <1, 1, 4> in the P Parity RAID grid (310) is determined by applying a P parity function (e.g., an XOR function) to data from the following RAID grid locations: (i) data from RAID grid 1 (304)<1,1,1>, (ii) data from RAID grid 2 (306)<1,1,2>, and (iii) data from RAID grid 3 (308)<1,1,3>. The values for data in the other RAID grid locations in P Parity RAID grid (310) are calculated in a similar manner.

Further, data in each of the RAID grid locations in Q Parity RAID grid (312) are arranged in a similar manner to RAID grid 1 (304), RAID grid 2 (306), and RAID grid 3 (308). Further, as described above, the value of the data in each of the RAID grid locations in Q Parity RAID grid (312) is calculated using data from one RAID grid location in each of the data grids in the RAID cube (i.e., RAID grid 1 (304), RAID grid 2 (306), and RAID grid 3 (308)). For example, the value of the data at RAID grid location <1, 1, 5> in the Q Parity RAID grid (312) is determined by applying a Q parity function (as described above) to data from the following RAID grid locations: (i) data from RAID grid 1 (304)<1,1,1>, (ii) data from RAID grid 2 (306)<1,1,2>, and (iii) data from RAID grid 3 (308)<1,1,3>. The values for data in the other RAID grid locations in Q Parity RAID grid (312) are calculated in a similar manner.

Figure 4A:
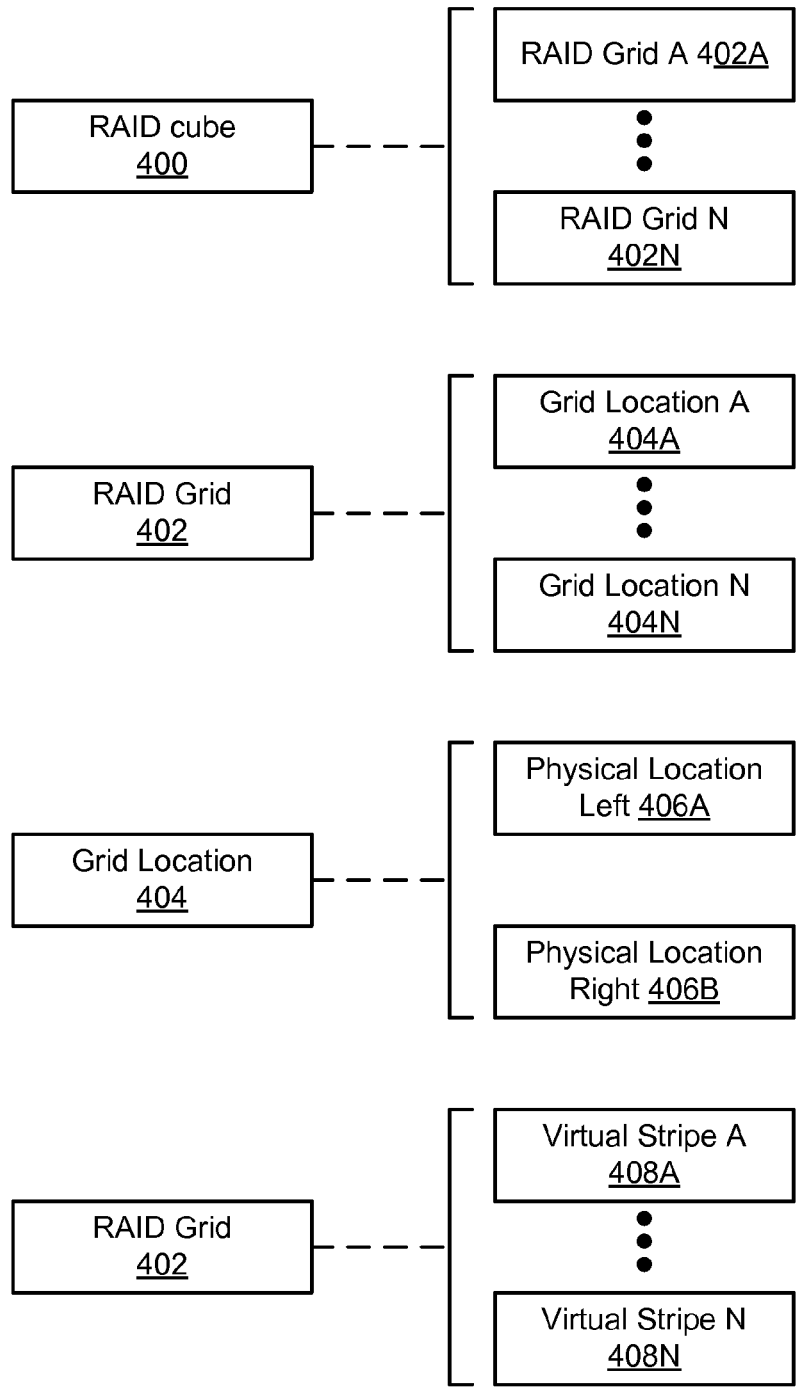
FIGS. 4A-4B show data structures in accordance with one embodiment of the invention.
Figure 4B:
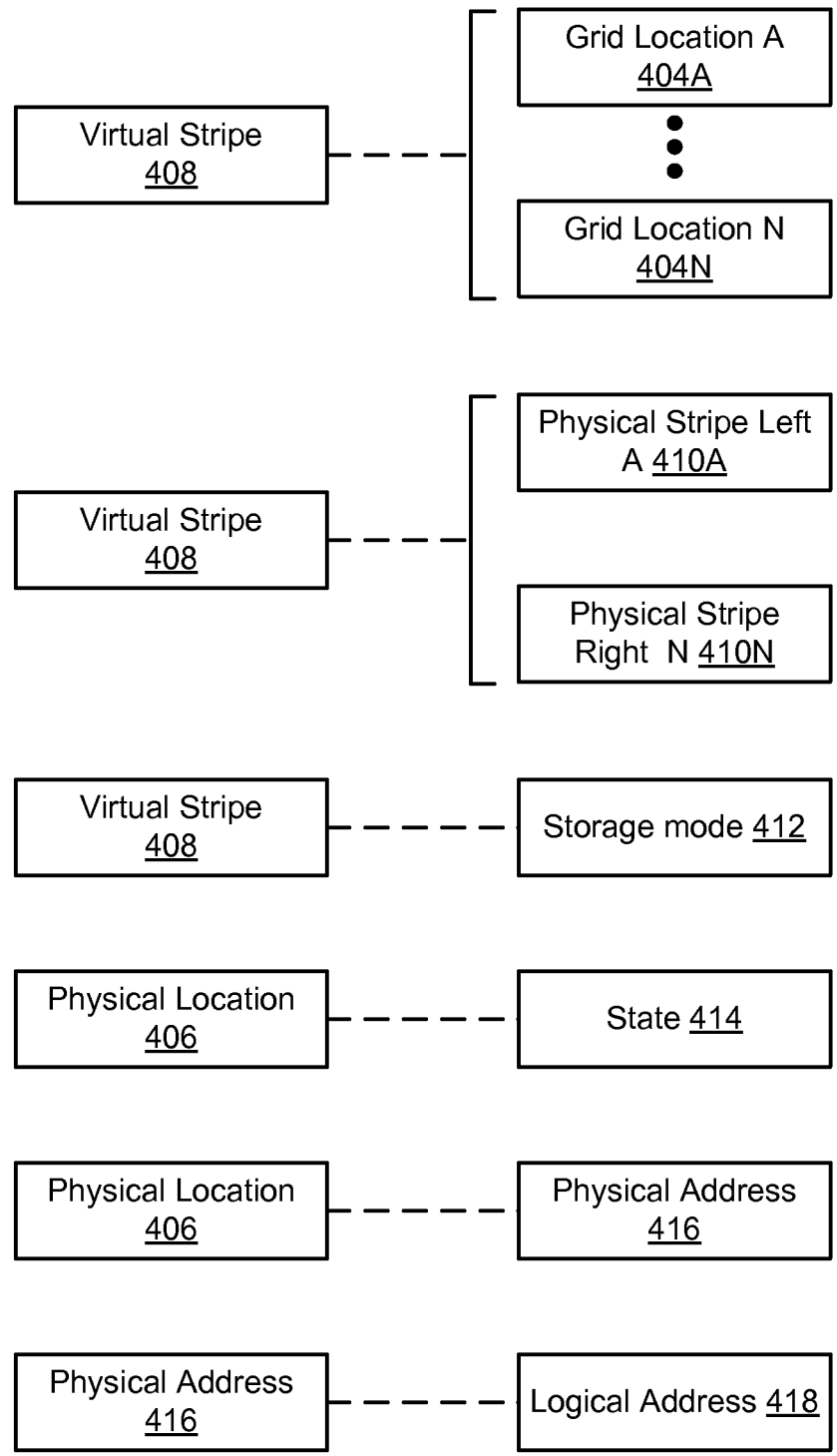

FIGS. 4A-4B show relationships between the various components in the system in accordance with one or more embodiments of the invention. In one embodiment of the invention, the RAID controller includes one or more data structures to track the relationships shown in FIGS. 4A-4B. The RAID controller may track one or more of the following relationships without departing from the invention. Said another way, the RAID controller may implement the invention without tracking all of the relationships shown in FIGS. 4A-4B.

In one embodiment of the invention, each RAID cube (400) is associated with two or more RAID grids (402A, 402N). If the RAID controller does not implement RAID grids then the relationship between RAID cubes and RAID grids is not tracked.

Each RAID grid (402) is associated with two or more grid locations (also referred to as RAID grid locations) (404A, 404N). The number of grid locations associated with each RAID grid may vary based on the implementation of the RAID grid.

As shown in FIG. 4A, each grid location (404) is associated with at least two physical locations (406A, 406B). If there are two physical locations associated with the grid location, then the physical locations may be referred to as physical location left (406A) and physical location right (406B). In one embodiment of the invention, all grid locations associated with a particular RAID grid are associated with the same number of physical locations. However, grid locations associated with other RAID grids implemented by the RAID controller may be associated with a different number of physical locations.

As discussed above, each RAID grid (402) is associated with one or more virtual stripes (408A, 408N) (see FIG. 4A), where each of the virtual stripes (408) is made up of sets of grid locations (404A, 404N) associated with the RAID grid (402). A given grid location (404A, 404N) may be associated with multiple virtual stripes (408).

As shown in, e.g., in FIG. 4A, each virtual stripe (408) is associated with at least two physical stripes (410A, 410N). If there are two physical stripes associated with the virtual stripe, then the physical stripes may be referred to as physical stripe left (410A) and physical stripe right 410N. In one embodiment of the invention, all virtual stripes associated with a particular RAID grid are associated with the same number of physical stripes. However, virtual stripes associated with other RAID grids implemented by the RAID controller may be associated with a different number of physical stripes.

Each virtual stripe (408) is associated with a storage mode (412). The storage mode may be mirrored mode or non-mirrored mode. In mirrored mode, the physical stripes associated with the virtual stripe include the same data (including parity data). In non-mirrored mode the physical stripes associated with the virtual stripe may include different data (including parity data). In one embodiment of the invention, a given RAID grid may include virtual stripes that are in mirrored mode and virtual stripes that are in non-mirrored mode. In an alternate embodiment of the invention, the storage mode may be specified on a per grid location basis as opposed to a per virtual stripe basis. In such embodiments, a given virtual stripe may include grid locations implementing both mirroring and non-mirroring mode.

Each physical location is associated with a state (414). The state (414) may be set as filled (denoting that data (or parity data) has been written to the physical location) or empty (denoting that no data (or parity data) has been written to the location). The state of the physical location may also be set to filled if the RAID controller has identified data in the RAID controller to write to the physical location (see e.g., FIG. 5A, Step 516). The RAID controller may initialize the state of each physical location to empty.

Each physical location (406) is associated with a physical address (416), which defines the physical location within the persistent storage. The physical address may be specified using the following n-tuple: <storage module, channel, chip, plane, block, page, byte>. Other n-tuples may be used to represent the physical address without departing from the invention. Further, other forms of physical addresses may be used without departing from the invention.

Each physical address 416 is also associated with a logical address (418), (e.g., <object, offset>), which identifies the data from the perspective of the client. Any form of logical address may be used without departing the invention. The RAID controller may provide a mechanism for translating or otherwise associating a particular logical address with a particular physical address.

Though not shown in FIGS. 4A-4B, the RAID controller may also maintain information about the RAID grid geometry. The RAID grid geometry may include, but is not limited to, the size of RAID grid, the IFD associated with each dimension of the RAID grid, the size of the RAID cube, the IFD associated with each dimension of the RAID cube, and the location of each P and Q parity value (including parity values within the intersection parity group (see FIG. 2A)) within each row and/or column within each RAID grid.

Figure 5A:
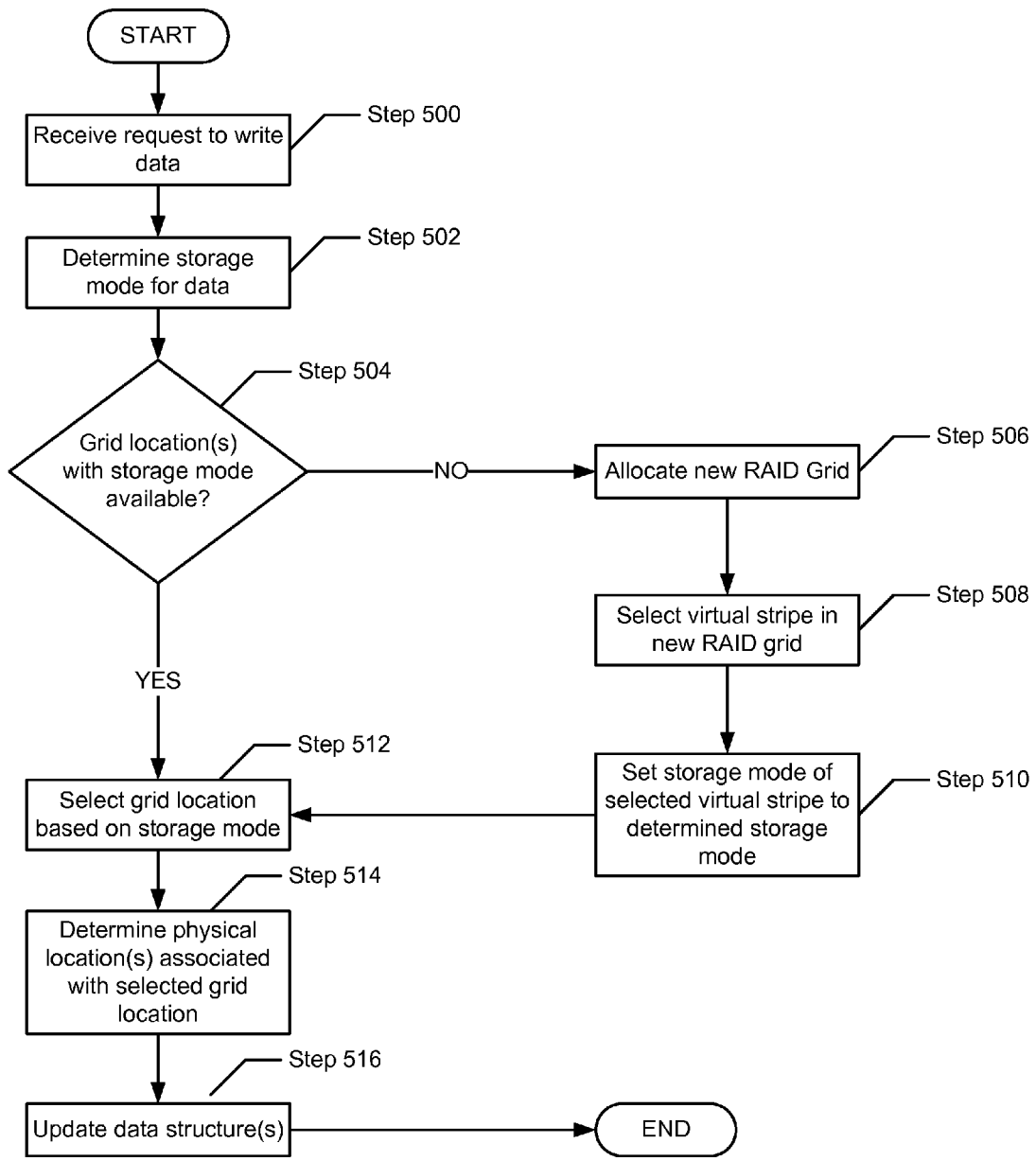
FIGS. 5A-5C show flow charts in accordance with one embodiment of the invention.
Figure 5B:
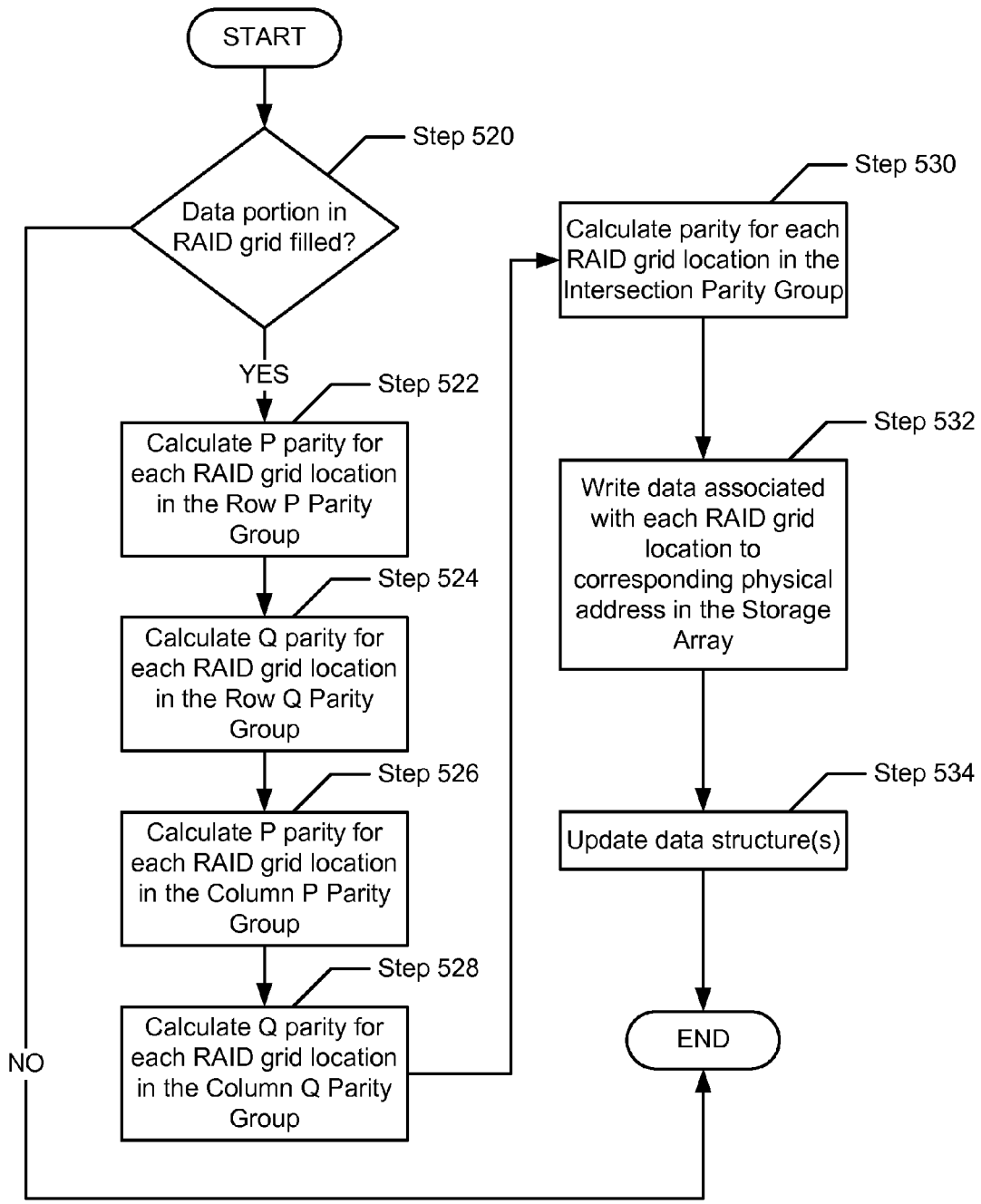
Figure 5C:
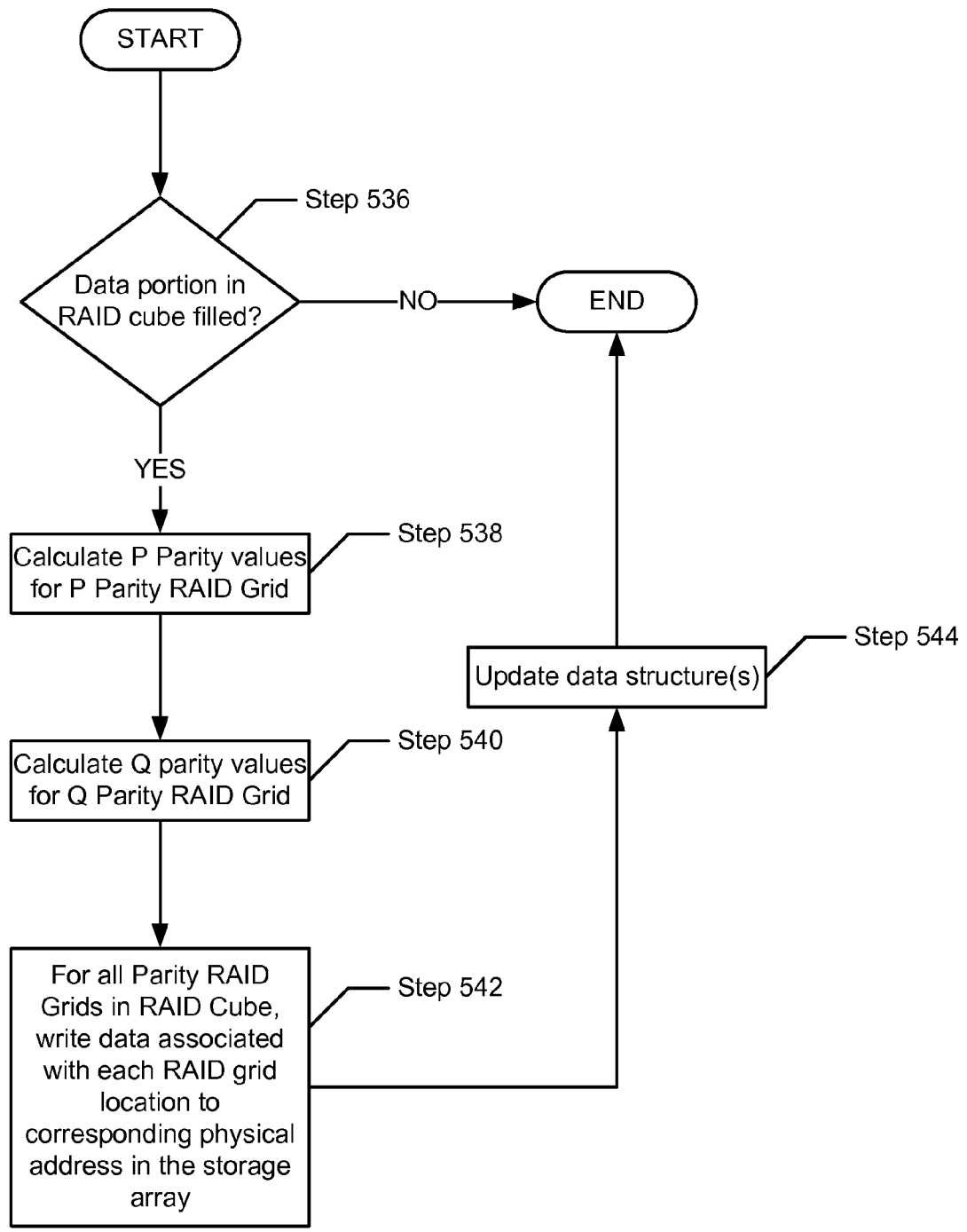

FIGS. 5A-5C show flowcharts in accordance with one or more embodiments of the invention. More specifically, FIGS. 5A-5C show a method for storing data in a storage array in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the methods shown in FIGS. 5A, 5B, and 5C may be performed in parallel.

Referring to FIG. 5A, in step 500, a request to write data is received from the client. In one embodiment of the invention, the request includes the logical address of the data that the client is requesting to be written to the storage array. In step 502, the storage mode (e.g., mirrored or non-mirrored) is determined. In one embodiment of the invention, the storage mode is determined based on information in the request from the client or based on information communicated to the client in a separate request or by another communication mechanism. In other embodiments of the invention, the storage mode is determined by the RAID controller (or another process or component in the system). In such embodiments the RAID controller (or another process or component in the system) determines the storage mode based on, for example, policy settings, information about the client that issued the write request, QoS guarantees, and/or information about the data (e.g., size, type, etc.).

In Step 504, a determination is made about whether there is an available grid location(s) that implements the storage mode determined in Step 502. In one embodiment of the invention, the determination in step 504 involves searching for available grid locations in the currently active RAID grids (i.e., RAID grids in which the data grid portion, 202 in FIG. 2A, is not filled) using, for example, the data structures that store information as described in FIGS. 4A-4B. If there is an available grid location(s), the grid location(s) is identified and the process proceeds to Step 512; otherwise, the process proceeds to step 506.

In Step 506, a new RAID grid is allocated. In Step 508, a virtual stripe is selected from the new RAID grid. In Step 510, the storage mode for the selected virtual stripe has a storage mode corresponding to the storage mode determined in Step 502.

In Step 512, a grid location is selected. In one embodiment of the invention, the grid location is either selected from the grid locations identified in step 504 or from the grid locations in the new virtual stripe selected in step 508.

In one embodiment of the invention, if the storage mode is determined on a per grid location basis instead of on a per virtual stripe basis, then steps 508 and 510 may be performed on a particular grid location as opposed to a virtual stripe.

Continuing with FIG. 5A, in Step 514, the physical location(s) associated with the grid location is determined. In one embodiment of the invention, the number of physical locations identified depends on the storage mode determined in Step 502. For example, if the storage mode is non-mirrored then only one physical location associated with the grid location is identified. Alternatively, if the storage mode is mirrored, then at least two physical locations associated with the grid location are identified.

In Step 516, the RAID controller updates one or more of the data structures to reflect that data is to be written to the physical location(s) (see FIGS. 4A-4B). The steps shown in FIG. 5A may be preformed each time data is to be written to the storage array.

Referring to FIG. 5B, FIG. 5B shows a method for writing a RAID grid to the storage array in accordance with one or more embodiments of the invention. Referring to FIG. 5B, in step 520, a determination is made about whether a data grid within a given RAID grid (e.g., 202 in FIG. 2A) is filled. In one embodiment of the invention, the data grid is "filled" when all the state of all physical locations associated with the grid locations in the data grid are set to filled. In one embodiment of the invention, this determination is made using one or more of the data structures described with respect to FIGS. 4A and 4B. If the data grid within a given RAID grid is filled, the process proceeds to step 522; otherwise, the process ends.

In step 522, the P parity is calculated for each physical location corresponding to a RAID grid location in the Row P parity group (e.g., 204 in FIG. 2A) using the appropriate values from the corresponding physical locations (see e.g., FIG. 2A discussed above). In step 524, the Q parity is calculated for each physical location corresponding to a RAID grid location in the Row Q parity group (e.g., 206 in FIG. 2A) using the appropriate values from the corresponding physical locations (see e.g., FIG. 2A discussed above). In step 526, the P parity is calculated for each physical location corresponding to a RAID grid location in the Column P parity group (e.g., 208 in FIG. 2A) using the appropriate values from the corresponding physical locations (see e.g., FIG. 2A discussed above). In step 528, the Q parity is calculated for each physical location corresponding to a RAID grid location in the Column Q parity group (e.g., 210 in FIG. 2A) using the appropriate values from the corresponding physical locations (see e.g., FIG. 2A discussed above).

In step 530, the parity values for each physical location corresponding to a RAID grid locations in the intersection parity group (e.g., 212 in FIG. 2A) are calculated using the appropriate values from the physical locations corresponding to RAID grid locations in one or more of the Row P parity group (e.g., 204 in FIG. 2A), Row Q parity group (e.g., 206 in FIG. 2A), Column P parity group (e.g., 208 in FIG. 2A), and Column Q parity group (e.g., 210 in FIG. 2A).

In step 532, the data associated with each physical location corresponding to a RAID grid location for the RAID grid is written to the appropriate physical address in the storage array. In one embodiment of the invention, the data (including parity data) is written to the storage array in two phases. In the first phase, data or parity data associated with each physical location associated with the left portions of grid locations in the RAID grid is written, in parallel, to an appropriate storage module. In the second phase, data or parity data associated with each physical location associated with the right portions of grid locations in the RAID grid is written, in parallel, to an appropriate storage module. An example of the two phase write is described below in FIGS. 6A-6C. In one embodiment of the invention, the physical address in which to write data for each of the RAID grid locations is obtained from one or more of the data structures described with respect to FIGS. 4A-4B. In step 534, one or more data structures described with respect to FIGS. 4A-4B are updated to reflect that the RAID grid has been written to the storage array.

While the above embodiment describes writing all data (including parity data) for a RAID grid in parallel, the writing of the data (including parity data) may be staged without departing from the invention. For example, the data (excluding the parity data) may be written to the storage array in parallel while the parity data may be written to the storage array at a later time. The writes may be staged in other ways without departing from the invention.

In one embodiment of the invention, if the RAID controller is implementing a 3D RAID scheme, then the RAID controller may perform the method shown in FIG. 5C. Referring to FIG. 5C, in step 536, a determination is made about whether a data portion of the RAID cube is filled. In one embodiment of the invention, the data portion of RAID cube is filled when the state of all physical locations corresponding to grid locations in the data portion of the RAID cube are set to filled. If the data portion of the RAID cube is filled, the process proceeds to Step 538; otherwise the process ends. In one embodiment of the invention, this determination is made using one or more of the data structures described with respect to FIGS. 4A-4B.

In step 538, the P parity values for each physical location corresponding to a RAID grid location in the P parity RAID grid (e.g., 310 in FIG. 3A) is calculated. In one embodiment of the invention, the values for each of the RAID grid locations is calculated using one value obtained from each of the RAID grids in the data portion (e.g., 314 in FIG. 3A) of the RAID cube.

In step 540, the Q parity values for each physical location corresponding to a RAID grid location in the Q parity RAID grid (e.g., 312 in FIG. 3A) is calculated. In one embodiment of the invention, the values for each of the RAID grid locations is calculated using one value obtained from each of the RAID grids in the data portion (e.g., 314 in FIG. 3A) of the RAID cube.

In step 542, the data associated with each physical location corresponding to a RAID grid location in the Parity RAID grids (e.g., P Parity RAID Grid and Q Parity RAID Grid) is written to the appropriate physical address in the storage array. In one embodiment of the invention, the physical address in which to write data for each of the RAID grid locations is obtained from the one or more of the data structures described with respect to FIGS. 4A-4B. In step 544, one or more data structures described with respect to FIGS. 4A-4B are updated to reflect that the RAID cube has been written to the storage array.

Figure 6A:
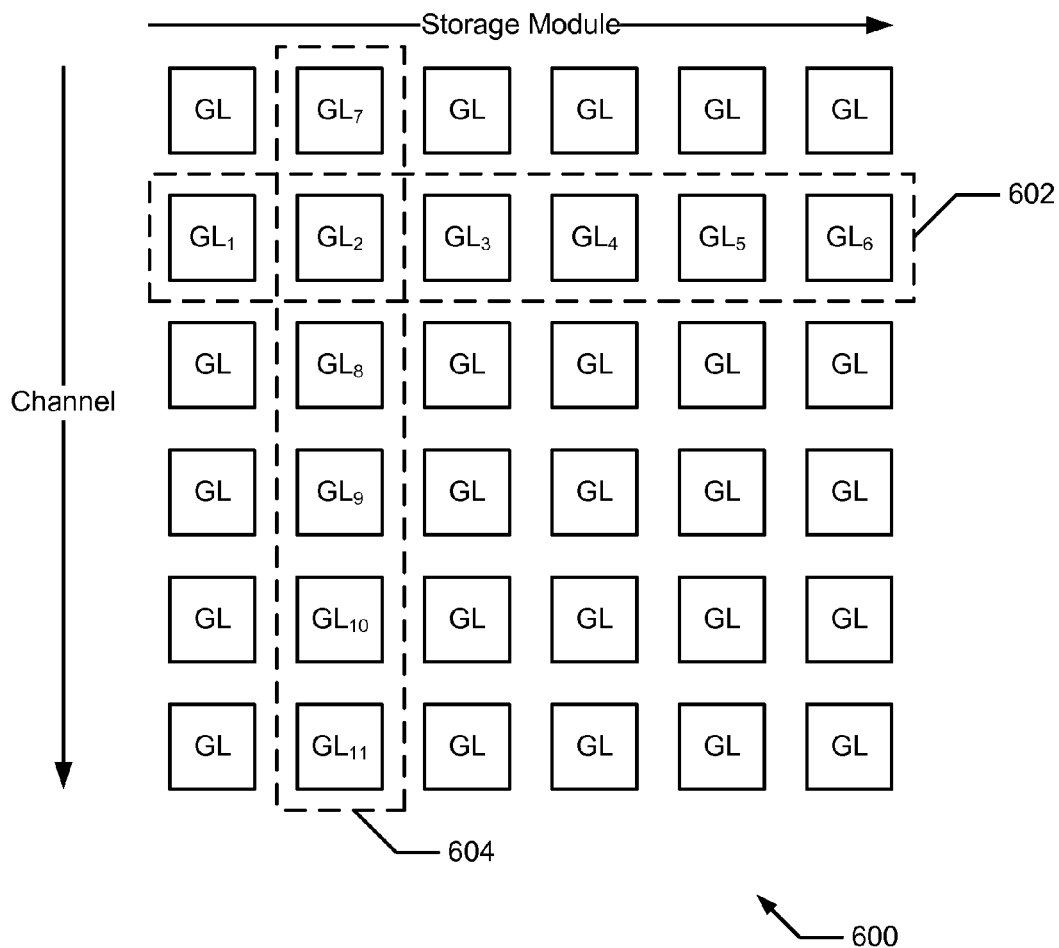
FIGS. 6A-6C show an example in accordance with one or more embodiments of the invention.
Figure 6B:
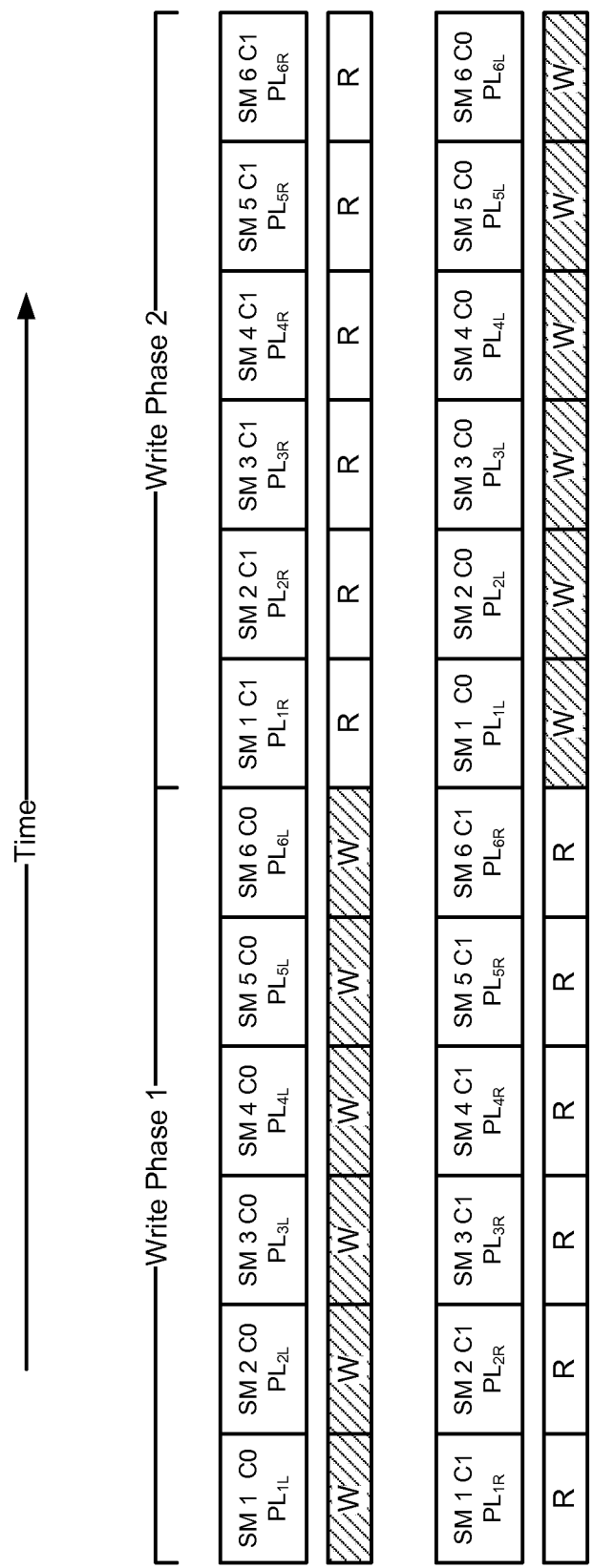
Figure 6C:
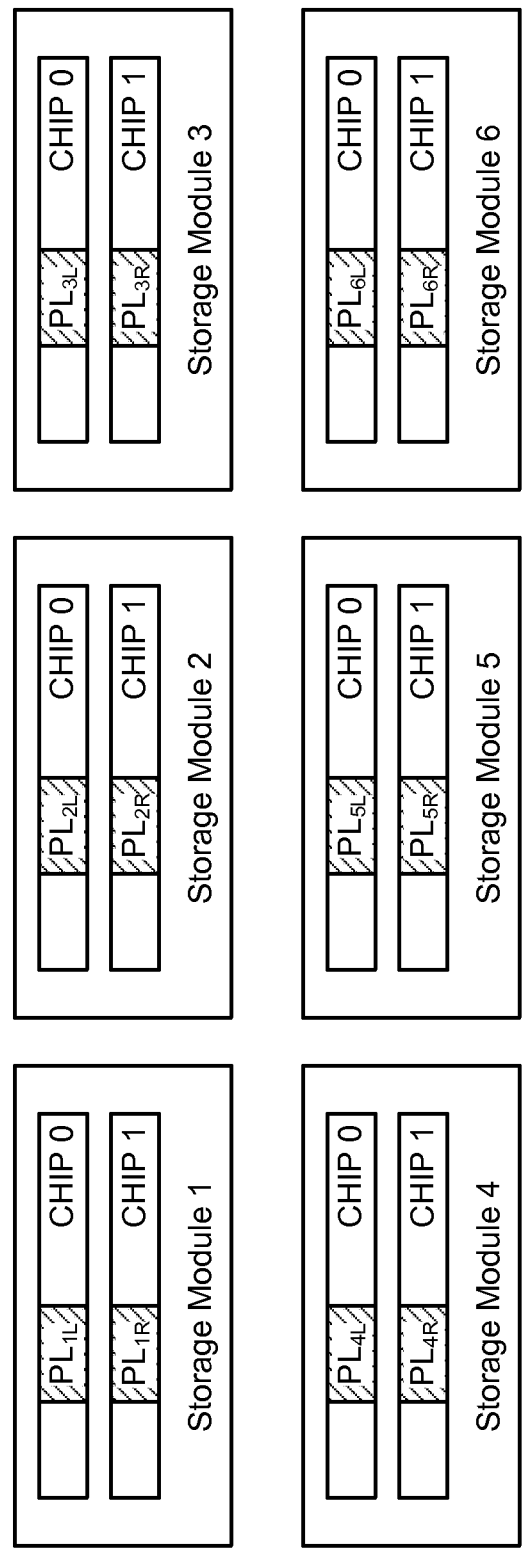

FIGS. 6A-6C show an example in accordance with one or more embodiments of the invention. The example is not intended to limit the scope of the invention.

Referring to FIG. 6A, FIG. 6A shows a RAID grid (600) that includes 36 grid locations (GL). Further, the physical locations corresponding to the aforementioned GL are distributed across storage modules and channels as shown in FIG. 6A. Consider the scenario in which four portions of data ($D_{1A}$-$D_{4A}$) are written to physical locations corresponding to $GL_1$, $GL_2$, $GL_3$, $GL_4$ in virtual stripe (602). Further, for purposes of this example, assume that the virtual stripe is implementing mirrored mode and that $GL_5$ includes the P parity values and $GL_6$ includes the Q parity values for the virtual stripe (602). The following table summarizes the data stored in each of the corresponding physical locations with the virtual stripe (602) when the virtual stripe is implementing mirrored mode.

TABLE 1

Mirrored Mode

| Grid Location | Physical Location | Data Stored in Physical Location |
|---|---|---|
| $GL_1$ | $PL_{L1}$ | $D_{1A}$ |
| $GL_1$ | $PL_{R1}$ | $D_{1A}$ |

TABLE 1-continued

Mirrored Mode

| Grid Location | Physical Location | Data Stored in Physical Location |
|---|---|---|
| $GL_2$ | $PL_{L2}$ | $D_{2A}$ |
| $GL_2$ | $PL_{R2}$ | $D_{2A}$ |
| $GL_3$ | $PL_{L3}$ | $D_{3A}$ |
| $GL_3$ | $PL_{R3}$ | $D_{3A}$ |
| $GL_4$ | $PL_{L4}$ | $D_{4A}$ |
| $GL_4$ | $PL_{R4}$ | $D_{4A}$ |
| $GL_5$ | $PL_{L5}$ | P-parity = $f_P(D_{1A}, D_{2A}, D_{3A}, D_{4A})$ |
| $GL_5$ | $PL_{R5}$ | P-parity = $f_P(D_{1A}, D_{2A}, D_{3A}, D_{4A})$ |
| $GL_6$ | $PL_{L6}$ | Q-parity = $f_Q(D_{1A}, D_{2A}, D_{3A}, D_{4A})$ |
| $GL_6$ | $PL_{R6}$ | Q-parity = $f_Q(D_{1A}, D_{2A}, D_{3A}, D_{4A})$ |

Consider an alternate scenario in which eight portions of data ($D_{1A}$-$D_{4A}$ and $D_{1B}$-$D_{4B}$) are written to physical locations corresponding to $GL_1$, $GL_2$, $GL_3$, $GL_4$ in virtual stripe (602). Further, for purposes of this example, assume that the virtual stripe is implementing non-mirrored mode and that $GL_5$ includes the P parity values and $GL_6$ includes the Q parity values for the virtual stripe (602). The following table summarizes the data stored in each of the corresponding physical locations with the virtual stripe (602) when the virtual stripe is implementing non-mirrored mode.

TABLE 2

Non-Mirrored Mode Example

| Grid Location | Physical Location | Data Stored in Physical Location |
|---|---|---|
| $GL_1$ | $PL_{L1}$ | $D_{1A}$ |
| $GL_1$ | $PL_{R1}$ | $D_{1B}$ |
| $GL_2$ | $PL_{L2}$ | $D_{2A}$ |
| $GL_2$ | $PL_{R2}$ | $D_{2B}$ |
| $GL_3$ | $PL_{L3}$ | $D_{3A}$ |
| $GL_3$ | $PL_{R3}$ | $D_{3B}$ |
| $GL_4$ | $PL_{L4}$ | $D_{4A}$ |
| $GL_4$ | $PL_{R4}$ | $D_{4B}$ |
| $GL_5$ | $PL_{L5}$ | P-parity = $f_P(D_{1A}, D_{2A}, D_{3A}, D_{4A})$ |
| $GL_5$ | $PL_{R5}$ | P-parity = $f_P(D_{B1}, D_{B2}, D_{B3}, D_{B4})$ |
| $GL_6$ | $PL_{L6}$ | Q-parity = $f_Q(D_{1A}, D_{2A}, D_{3A}, D_{4A})$ |
| $GL_6$ | $PL_{R6}$ | Q-parity = $f_Q(D_{1B}, D_{2B}, D_{3B}, D_{4B})$ |

Referring to FIG. 6A, virtual stripe (604) may be populated in the same manner as described above with respect to virtual stripe (602).

In one embodiment of the invention, once each physical location in the RAID grid is associated with data from the client or parity data (i.e., P or Q parity data), the RAID grid is ready to be written to the storage modules. The writing process is divided into two phases. In the first phase, data or parity data associated with each physical location associated with the left portions of grid location is written, in parallel, to an appropriate location in the storage array. In the second phase, data or parity data associated with each physical location associated with the right portions of grid location is written, in parallel, to an appropriate location in the storage array.

The following is an example of writing data (denoted as D) to the storage array in accordance with the mirrored mode. In this example assume that data ($D_{1A}$-$D_{4A}$) (as described above) is to be written to the storage array. When the RAID grid (that includes the virtual stripe (602)) is ready to be written to the storage array, the RAID controller (not shown) issues, in parallel, thirty-six write commands in phase 1 of the write process. Specifically, six write commands are issued to each storage module, where each write command for a given storage module targets a different chip on the storage module.

Table 3 shows a subset of write commands corresponding to the "Left Portion" of the virtual stripe (602) issued during phase 1 of the write process.

TABLE 3

Phase 1 Write Commands for "Left Portion" of Grid Locations

| Write Commands | Physical Location | Physical Address |
|---|---|---|
| Command 1 | $PL_{L1}$ | <flash module 1, channel 1, chip 0, plane 1, block 1, page 1, byte 1> |
| Command 2 | $PL_{L2}$ | <flash module 2, channel 1, chip 0, plane 1, block 1, page 1, byte 1> |
| Command 3 | $PL_{L3}$ | <flash module 3, channel 1, chip 0, plane 1, block 1, page 1, byte 1> |
| Command 4 | $PL_{L4}$ | <flash module 4, channel 1, chip 0, plane 1, block 1, page 1, byte 1> |
| Command 5 | $PL_{L5}$ | <flash module 5, channel 1, chip 0, plane 1, block 1, page 1, byte 1> |
| Command 6 | $PL_{L6}$ | <flash module 6, channel 1, chip 0, plane 1, block 1, page 1, byte 1> |

Following phase 1 of the write process, the RAID controller issues, in parallel, thirty-six write commands in phase 2 of the write process. Specifically, six write commands are issued to each storage module, where each write command for a given storage module targets a different chip on the storage module. Table 4 shows a subset of write commands corresponding to the "Right Portion" of the virtual stripe (602) issued during phase 2 of the write process.

TABLE 4

Phase 2 Write Commands for "Right Portion" of Grid Locations

| Write Commands | Physical Location | Target Location |
|---|---|---|
| Command 7 | $PL_{R1}$ | <flash module 1, channel 1, chip 1, plane 1, block 1, page 1, byte 1> |
| Command 8 | $PL_{R2}$ | <flash module 2, channel 1, chip 1, plane 1, block 1, page 1, byte 1> |
| Command 9 | $PL_{R3}$ | <flash module 3, channel 1, chip 1, plane 1, block 1, page 1, byte 1> |
| Command 10 | $PL_{R4}$ | <flash module 4, channel 1, chip 1, plane 1, block 1, page 1, byte 1> |
| Command 11 | $PL_{R5}$ | <flash module 5, channel 1, chip 1, plane 1, block 1, page 1, byte 1> |
| Command 12 | $PL_{R6}$ | <flash module 6, channel 1, chip 1, plane 1, block 1, page 1, byte 1> |

FIG. 6B shows which chips in each of the flash modules are actively writing (W) or available to service a read request (R) during each of the aforementioned write phases. FIG. 6C shows the state of the 12 chips in the storage modules after the commands in Tables 3 and 4 have been issued.

Figure 7A:
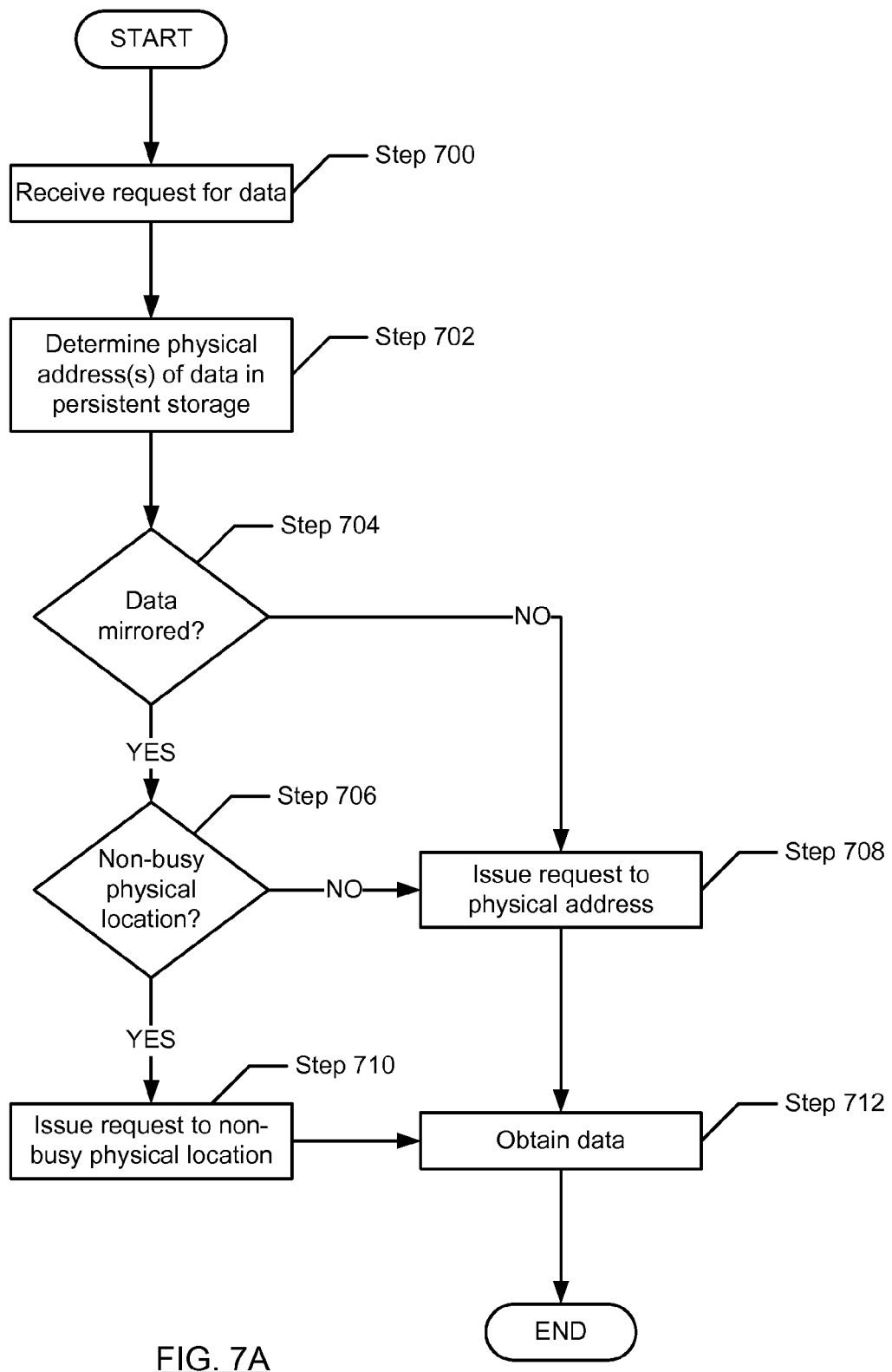
FIGS. 7A-7B show flow charts in accordance with one or more embodiments of the invention.
Figure 7B:
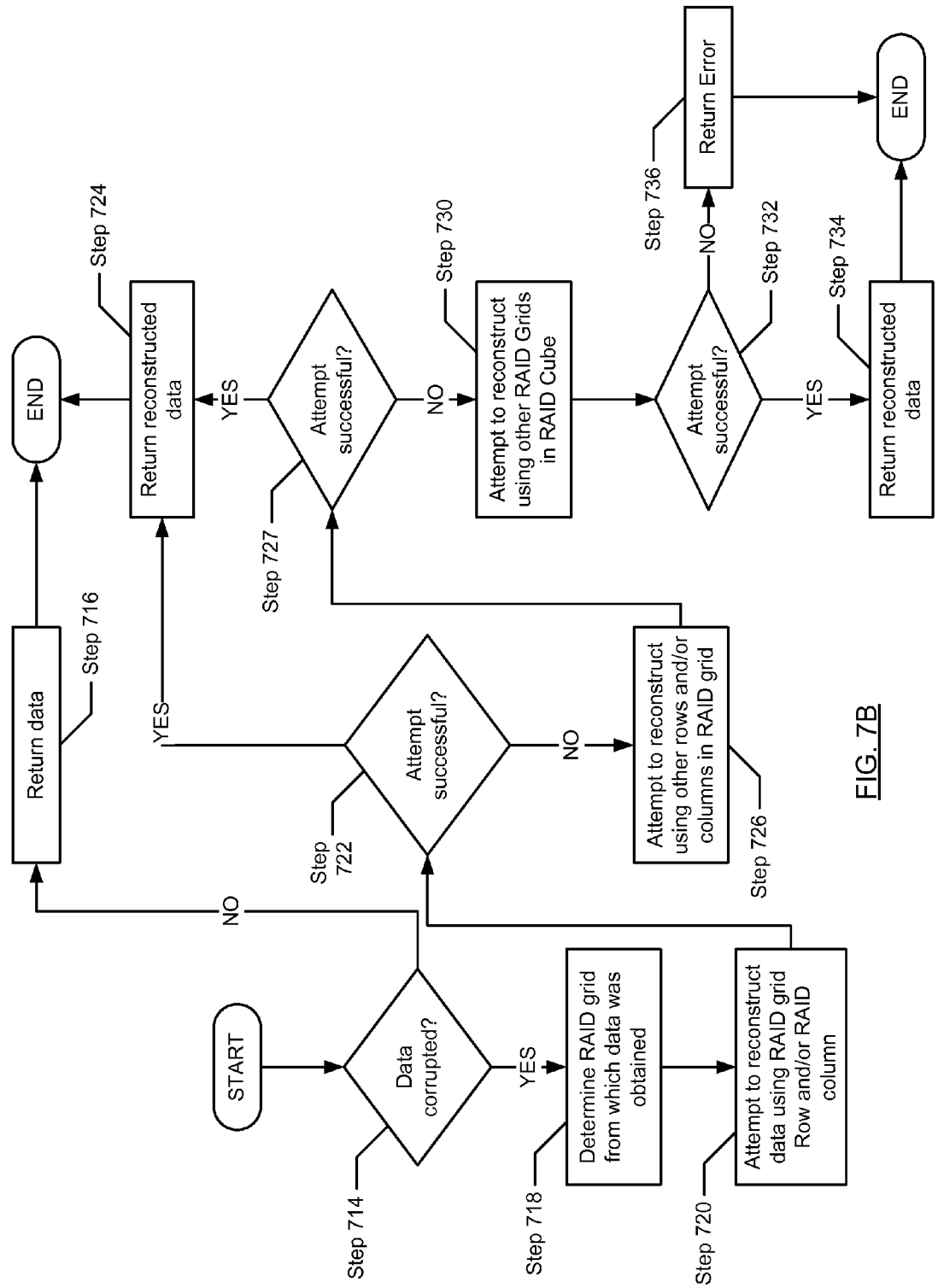

FIGS. 7A-7B show flowcharts in accordance with one or more embodiments of the invention. More specifically, FIGS. 7A-7B show a method for obtain data from the storage array in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the methods shown in FIGS. 7A and 7B may be performed in parallel.

In Step 700, a request to obtain data from the persistent storage is received. In one embodiment of the invention, the request may be a read request issued by a client. In one embodiment of the invention, the request may specify a logical address associated with the data.

In Step 702, the physical address(es) associated with the requested data are obtained. In one embodiment of the invention, the aforementioned physical addresses may be determined using the data structures described above with respect to FIGS. 4A-4B.

In Step 704, a determination is made about whether the data is mirrored. In one embodiment of the invention, this determination may include (i) determining the grid location with which the physical address is associated, (ii) determining the virtual stripe with which the grid location is associated, and (iii) determining the storage mode associated with the virtual stripe identified in (ii). If the storage mode is set on a per grid level basis, then the determination in Step 704 may be performed by (i) determining the grid location with which the physical address is associated and (ii) determining the storage mode associated with the grid location identified in (i). If the virtual storage is implementing mirrored mode, then the data is mirrored and the process proceeds to Step 706; otherwise the process proceeds to Step 708.

When the data is mirrored, the data may be obtained from at least two different physical locations. In such cases, in Step 706, a determination is made about whether any of the physical locations in which the data is located is non-busy (i.e., the chip on which the data is located is not currently servicing a write or erase request). If any of the physical locations in which the data is located is non-busy, the process proceeds to step 710; otherwise the process proceeds to step 708.

In Step 708, a read request is issued to the persistent storage using a physical address obtained in step 702. In Step 710, a read request is issued to the persistent storage using a physical address (obtained in step 702) corresponding to the non-busy physical location. In Step 712, data is obtained (via Steps 708 or 710) from the physical location corresponding to the physical address in the request.

Referring to FIG. 7B, in step 714, a determination is made about whether the data obtained in step 712 is corrupted. In one embodiment of the invention, the RAID controller may implement any known method (e.g., checksums) for determining whether the data is corrupted. If the data is not corrupted the process proceeds to step 716; otherwise the process proceeds to step 718. In step 716, the data is returned to the client and the process ends. In another embodiment of the invention, if the data is unable to be obtained—for example, because the persistent storage is damaged or unplugged, or the read command fails, then the process may proceed to Step 718.

In step 718, the RAID controller determines from which RAID grid the data was obtained. In step 720, the RAID controller attempts to reconstruct the data using, if available, a mirrored copy of the data (see FIG. 2A), and/or using physical locations corresponding to the other RAID grid locations within the row and/or column in which the physical location that included the data is located.

In step 722, a determination is made about whether the reconstruction attempt in step 720 was successful. In one embodiment of the invention, the RAID controller may implement any known method (e.g., checksums) for determining whether the reconstruction attempt was successful. If the reconstruction attempt in step 722 was successful, the process proceeds to step 724; otherwise the process proceeds to step 726. In step 724, the reconstructed data is returned to the client and the process ends.

In step 726, the RAID controller attempts to reconstruct the data using physical locations corresponding to the other RAID grid locations in other rows and/or columns the RAID grid. In step 727, a determination is made about whether the reconstruction attempt in step 726 was successful. In one embodiment of the invention, the RAID controller may implement any known method (e.g., checksums) for determining whether the reconstruction attempt was successful. If the reconstruction attempt in step 726 was successful, the process proceeds to step 724; otherwise the process proceeds to step 730.

In step 730, the RAID controller attempts to reconstruct the data using physical locations corresponding to the other RAID grids in the RAID cube. In step 732, a determination is made about whether the reconstruction attempt in step 730 was successful. In one embodiment of the invention, the RAID controller may implement any known method (e.g., checksums) for determining whether the reconstruction attempt was successful. If the reconstruction attempt in step 730 was successful, the process proceeds to step 734; otherwise the process proceeds to step 736. In step 734, the reconstructed data is returned to the client and the process ends. In step 736, the RAID controller returns an error to the client, which indicates that the requested data cannot be retrieved from the storage array by the RAID controller.

Those skilled in the art will appreciate that reconstructing the data using the other RAID grids in the RAID cube only occurs in the event that the RAID controller is implementing a 3D RAID scheme.

Figure 8A:
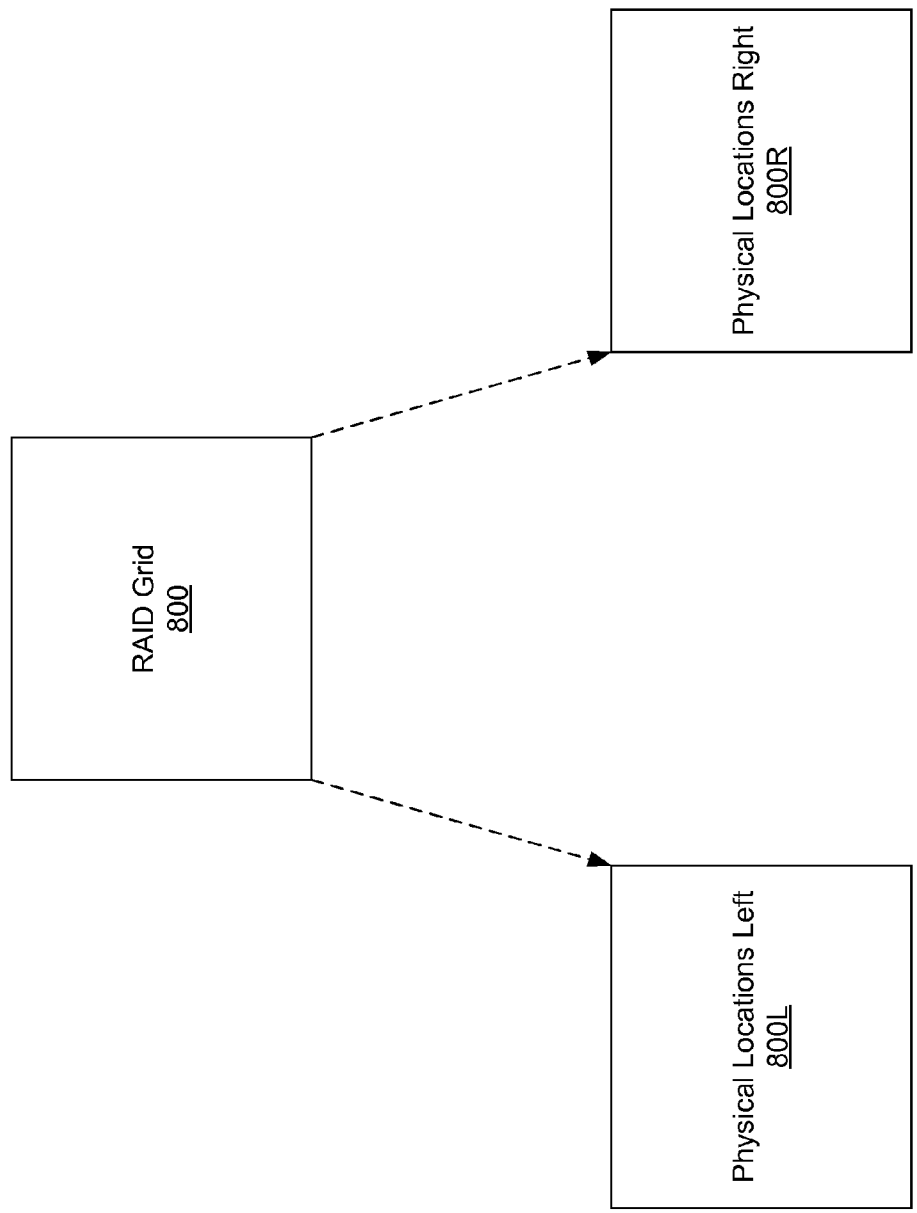
FIGS. 8A-8E show an example in accordance with one or more embodiments of the invention.

FIGS. 8A-8E show an example in accordance with one or more embodiments of the invention. The example is not intended to limit the scope of the invention. Referring to FIG. 8A, consider a scenario in which the system includes a RAID grid (800) that includes a set of grid locations (see e.g., FIG. 2A). Further, the grid locations (not shown) are associated with a set of virtual stripes (not shown) all implementing mirrored mode. Finally, as shown in FIG. 8A, each of the grid locations (not shown) is associated with a two physical locations (see e.g., FIG. 2B). As result, the RAID grid (800) is associated with two sets of physical locations—physical locations left (800L) and physical locations right (800R).

Figure 8B:
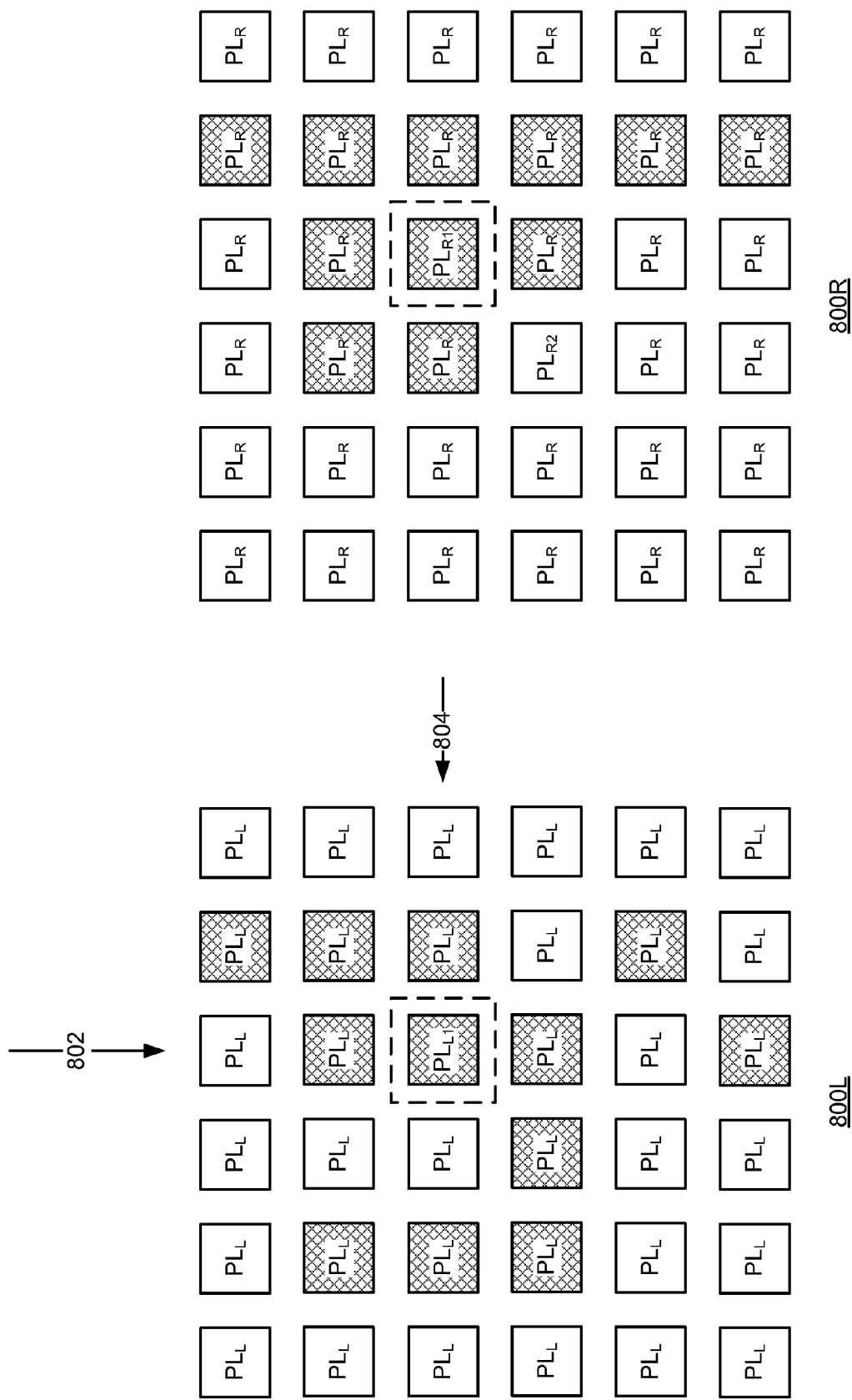

Referring to FIG. 8B, consider a scenario in which a client requested data that is located at $PL_{L1}$ in physical locations left (800L) and in $PL_{R1}$ in physical locations right (800R). However, the data in $PL_{L1}$ and $PL_{R1}$ is corrupted (as denoted by the shading). The RAID controller first attempts (per step 720 in FIG. 7B) to reconstruct the data in $PL_{L1}$ using data from physical locations in row (804) and/or column (802). However, because row (804) and column (802) each include three physical locations that include corrupted data, the data in $PL_{L1}$ cannot be recovered using only data from row (804) and/or column (802).

Figure 8C:
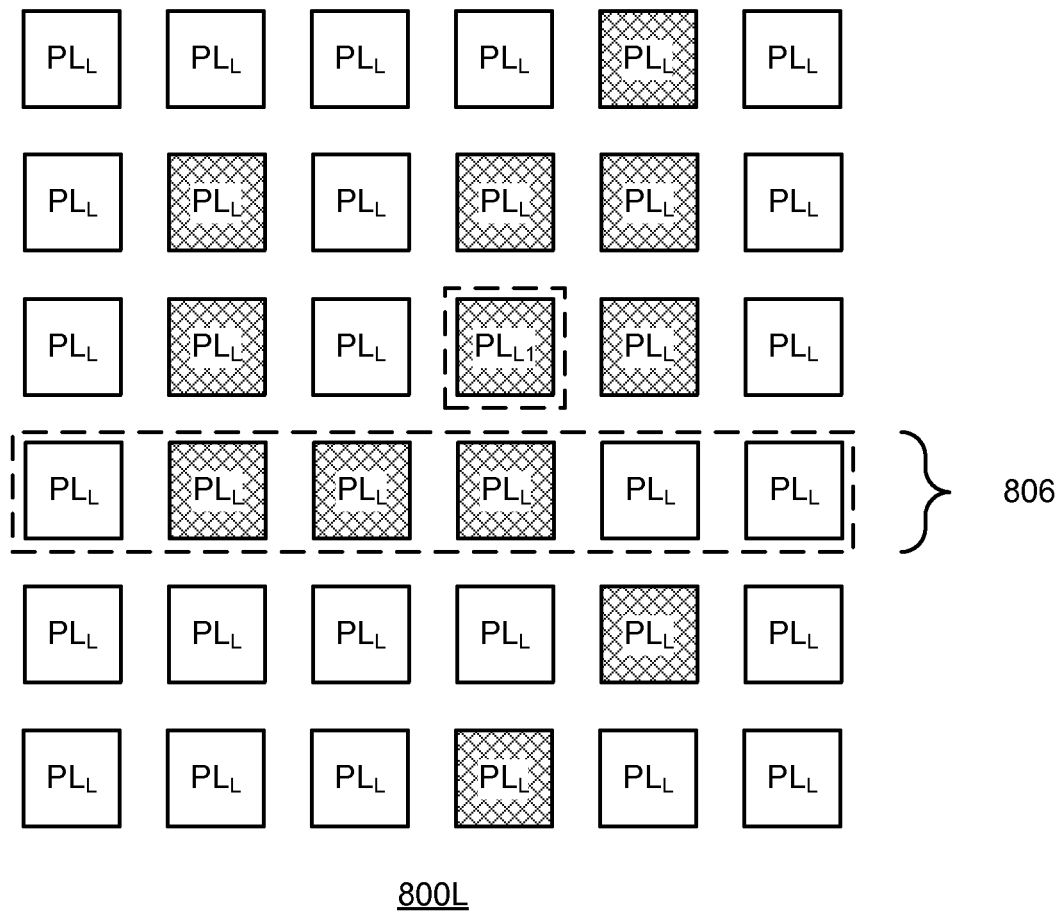
Figure 8D:
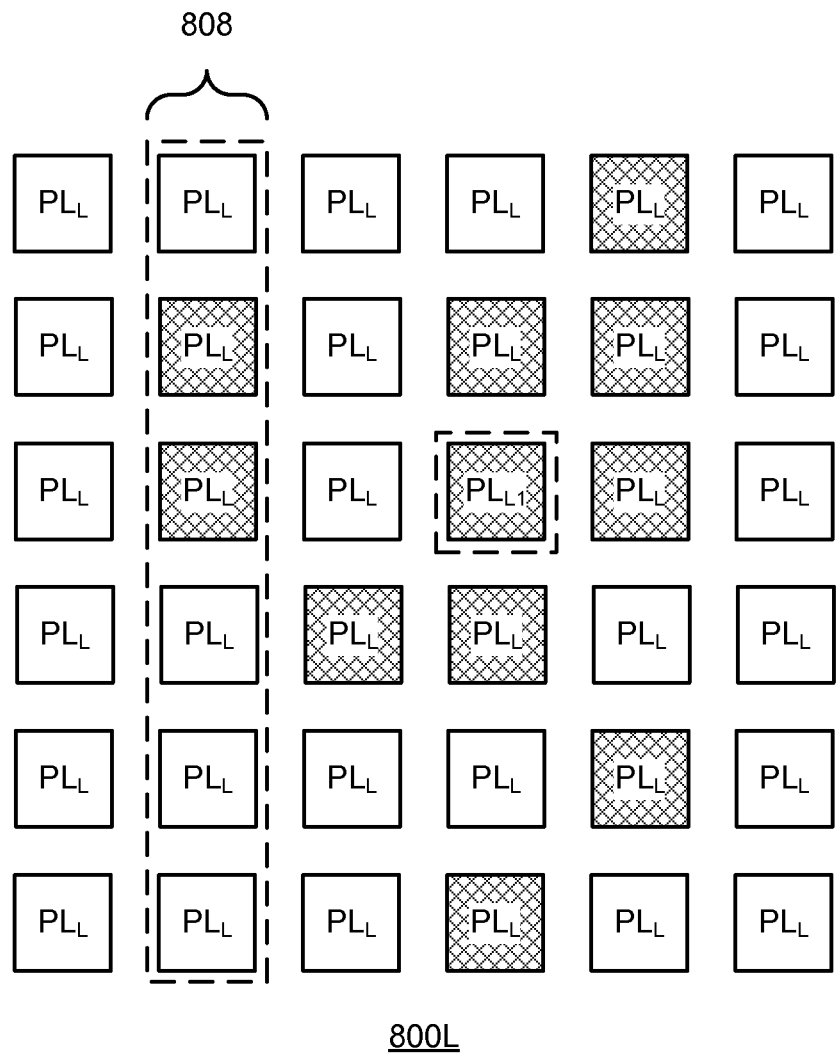
Figure 8E:
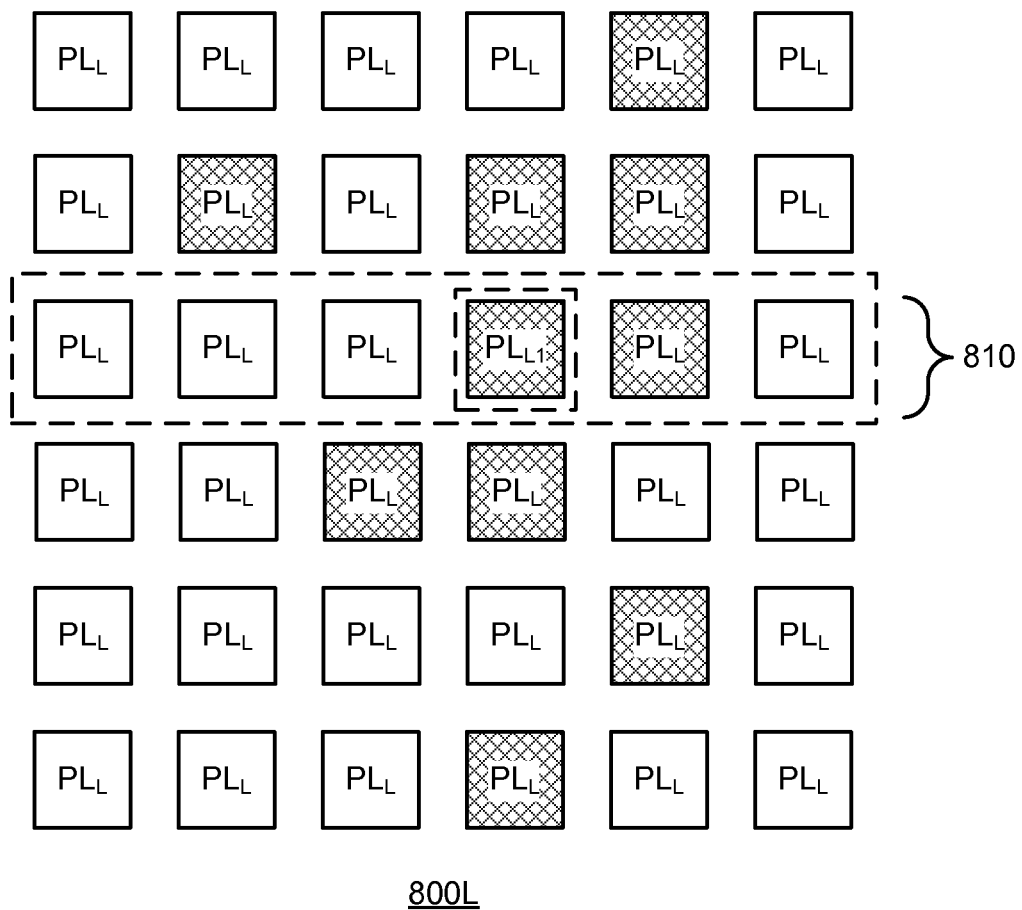

Referring to FIG. 8C, the RAID controller attempts (per step 726 in FIG. 7B) to reconstruct the data in $PL_{L1}$ using data from other physical locations in physical locations left (800L). In this example, there are no rows or columns in physical locations left (800L) that can be used to ultimately reconstruct $PL_{L1}$. However, the RAID controller can use data from $PL_{R2}$ (see FIG. 8B) in physical locations right (800R) in combination with data in the remaining physical locations in row (806) in physical locations left (800L) to reconstruct all corrupted data in row (806). Referring to FIG. 8D, based on the reconstruction of the corrupted data in row (806), the RAID controller is able to reconstruct all corrupted data in column (808). Finally, referring to FIG. 8E, based on the reconstruction of the corrupted data in column (808), the RAID controller is able to reconstruct the data in $PL_{L1}$ using the other non-corrupted data in row (810). In one embodiment of the invention, the reconstruction of the various corrupted data as shown in FIGS. 8B-8E are performed as part of steps 720 and 726 in FIG. 7B.

Though not shown in FIGS. 8A-8E, if the data in $PL_{L1}$ could not be reconstructed using only the data in the RAID grid, the RAID controller would attempt to reconstruct the data in $PL_{L1}$ (per Step 730) in FIG. 7B) using data in other RAID grids within a RAID cube (not shown) if the RAID controller was implementing a 3D RAID scheme.

Those skilled in the art will appreciate that while various examples of the invention have been described with respect to storing data in a storage array along IFDs and/or storing data in NAND flash, embodiments of the invention may be implemented on any multi-dimensional storage device array without departing from the invention. For example, one or more embodiments of the invention may be implemented using a two dimensional array of storage devices (magnetic, optical, solid state, or any other type of storage device), where data for each RAID grid location in a RAID grid is stored on a separate storage device.

Further, in one embodiment of the invention, in the event that the RAID controller is implementing a 3D RAID scheme using a two dimensional array of storage devices, the RAID controller may store data for each of the RAID grid locations using the following n-tuple: <storage device x, storage devices y, logical block address (LBA) z>, where x and y are the dimensions of the storage device array. Further, for a given RAID grid the LBA is constant for each RAID grid location for a single RAID grid; however, the LBA is different across the RAID grids in the RAID cube.

The above examples for implementing embodiments of the invention using a two-dimensional storage device array are not intended to limit the scope of the invention.

Those skilled in the art will appreciate that while the invention has been described with respect to a 2D RAID scheme and a 3D RAID scheme, embodiments of the invention, may be extended to any multi-dimensional RAID scheme.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method, the method for storing data comprising:
   receiving a request to write data;
   determining a storage mode for the data, wherein the storage mode for the data is mirrored mode;
   selecting a Redundant Array of Independent Devices (RAID) grid location in a RAID grid to write the data based on the storage mode;
   writing the data to memory, wherein the data is temporarily stored in the memory;
   updating a data structure to indicate that the RAID grid location is filled;
   determining, using the data structure, whether a data grid in the RAID grid is filled, wherein the RAID grid location is in the data grid;

based on a determination that the data grid is filled:
  calculating parity values for the RAID grid using the data;
  determining a first physical address in persistent storage corresponding to the RAID grid location;
  determining a second physical address in the persistent storage corresponding to the RAID grid location;
  writing the data to a first physical location in the persistent storage corresponding to the first physical address;
  writing the data to a second physical location in the persistent storage corresponding to the second physical address; and
  writing the parity values associated with data grid to the persistent storage.

2. The non-transitory computer readable medium of claim 1, the method further comprising:
  receiving a second request to write second data;
  determining a second storage mode for the second data, wherein the storage mode for the second data is non-mirrored mode;
  selecting, a second RAID grid location in the RAID grid to write the data based on the second storage mode;
  writing the second data to the memory, wherein the second data is temporarily stored in the memory;
  updating the data structure to indicate that the second RAID grid location is partially filled;
  receiving a third request to write third data;
  determining a third storage mode for the third data, wherein the third storage mode for the third data is the non-mirrored mode;
  selecting, the second RAID grid location in the RAID grid to write the data using the third storage mode;
  writing the third data to the memory, wherein the third data is temporarily stored in the memory;
  updating the data structure to indicate that the second RAID grid location is filled;
  based on the determination that the data grid is filled:
    determining a third physical address in the persistent storage corresponding to the second RAID grid location;
    determining a fourth physical address in the persistent storage corresponding to the second RAID grid location;
    writing the second data to a third physical location in the persistent storage corresponding to the third physical address; and
    writing the third data to a fourth physical location in the persistent storage corresponding to the fourth physical address.

3. The non-transitory computer readable medium of 2, wherein the RAID grid location is associated with a virtual stripe, wherein the virtual stripe is associated with a first physical stripe and a second physical stripe, wherein the first physical location is part of the first physical stripe and the second physical location is part of the second physical stripe, wherein the second RAID grid location is associated with a second virtual stripe, wherein the second virtual stripe is associated with a third physical stripe and a fourth physical stripe, wherein the third physical location is part of the third physical stripe, and wherein the parity values stored in the third physical stripe are different than the parity values stored in the forth physical stripe.

4. The non-transitory computer readable medium of claim 1, wherein the RAID grid location is associated with a virtual stripe, wherein the virtual stripe is associated with a first physical stripe and a second physical stripe, wherein the first physical location is part of the first physical stripe and the second physical location is part of the second physical stripe.

5. The non-transitory computer readable medium of claim 1, wherein the RAID grid location is associated with a virtual stripe, and a second virtual stripe.

6. The non-transitory computer readable medium of claim 4, wherein the parity values stored in the first physical stripe are equal to the parity values stored in the second physical stripe.

7. The non-transitory computer readable medium of claim 1, wherein the first physical location is specified using an n-tuple comprising a storage module, a channel, and a chip, wherein the second physical location is specified using the storage module, the channel, and a second chip.

8. The non-transitory computer readable medium of claim 1, wherein the data is written to the first physical location in persistent storage prior to writing the data to the second physical location.

9. The non-transitory computer readable medium of claim 8, wherein the persistent storage comprises a plurality of storage modules, wherein each of the plurality of storage modules comprises solid state memory.

10. The non-transitory computer readable medium of claim 1, wherein the parity values comprise at least one selected from a group consisting of P parity values, Q parity values, and intersection parity values.

11. The non-transitory computer readable medium of claim 1, wherein the RAID grid comprises a Row Q Parity Group, a Row P Parity Group, a Column Q Parity Group, a Column P Parity Group, and an Intersection Parity Group, wherein each of the parity values is associated with one selected from a group consisting of the Row Q Parity Group, the Row P Parity Group, the Column Q Parity Group, the Column P Parity Group, and the Intersection Parity Group.

12. The non-transitory computer readable medium of claim 11, wherein the parity values associated with the Intersection Parity Group are calculated using the parity values for at least one selected from a group consisting of the Row Q Parity Group, the Row P Parity Group, the Column Q Parity Group, and the Column P Parity Group.

13. A non-transitory computer readable medium comprising instructions, which when executed by a processor perform a method, the method for obtaining reconstructing data, comprising:
  receiving a first request for data;
  identifying a grid location in a Redundant Array of Independent Devices (RAID) grid associated with the data, wherein the grid location is associated with a first physical location and a second physical location;
  making a first determination that a storage mode for the grid location is mirrored mode;
  based on the first determination, making a second determination that the first physical location is busy;
  based on the second determination, issuing a second request for the data to the second physical location; and
  in response to the second request, receiving the data from the second physical location,
  wherein the grid location is associated with a virtual stripe,
  wherein the virtual stripe is associated with a first physical stripe and a second physical stripe,
  wherein the first physical location is part of the first physical stripe and the second physical location is part of the second physical stripe.

14. The non-transitory computer readable medium of claim 13, further comprising:
  making a third determination that the data obtained from the second physical location is corrupted;
  based on the third determination, issuing a third request for the data to the first physical location.

15. The non-transitory computer readable medium of claim 14, the method further comprising:
  making a fourth determination that the data obtained from the second physical location is corrupted; and
  based on the fourth determination, attempting to reconstruct the data using at least one selected from a group consisting of the first physical stripe and the second physical stripe.

16. The non-transitory computer readable medium of claim 14, the method further comprising:
  making a fourth determination that the data obtained from the second physical location is corrupted; and
  based on the fourth determination, attempting to reconstruct the data using the first physical stripe.

17. The non-transitory computer readable medium of claim 16, the method further comprising:
  making a fifth determination that the attempt to reconstruct the data using the first physical stripe failed; and
  based on the fifth determination, attempting to reconstruct the data using the second physical stripe.

18. The non-transitory computer readable medium of claim 13, wherein the first physical location is on a first chip in a persistent storage and the second physical location is on a second chip in the persistent storage, and wherein the first chip and the second chip may perform Input/Output (I/O) operations in parallel.

19. The non-transitory computer readable medium of claim 18, wherein the I/O operations comprise at least one selected from a group consisting of a read operation, a write operation, and an erase operation.

* * * * *